(12) United States Patent
Kapoustin

(10) Patent No.: US 10,074,079 B2
(45) Date of Patent: Sep. 11, 2018

(54) SYSTEMS AND METHODS FOR AUTOMATED ANALYSIS, SCREENING AND REPORTING OF GROUP PERFORMANCE

(71) Applicant: Alpha Beta Analytics, LLC, Millbrae, CA (US)

(72) Inventor: Grigori Kapoustin, Millbrae, CA (US)

(73) Assignee: Alpha Beta Analytics, LLC, Millbrae, CA (US)

( * ) Notice: Subject to any disclaimer, the term of this patent is extended or adjusted under 35 U.S.C. 154(b) by 950 days.

(21) Appl. No.: 14/449,870

(22) Filed: Aug. 1, 2014

(65) Prior Publication Data

US 2015/0039652 A1 Feb. 5, 2015

Related U.S. Application Data

(60) Provisional application No. 61/861,236, filed on Aug. 1, 2013, provisional application No. 61/884,950, filed on Sep. 30, 2013.

(51) Int. Cl.
*G06F 17/30* (2006.01)
*G06Q 10/00* (2012.01)
*G06Q 10/06* (2012.01)

(52) U.S. Cl.
CPC ....... *G06Q 10/20* (2013.01); *G06F 17/30421* (2013.01); *G06Q 10/0631* (2013.01)

(58) Field of Classification Search
None
See application file for complete search history.

(56) References Cited

U.S. PATENT DOCUMENTS 7,536,331 B1 * 5/2009 Pellegrino .............. G06Q 40/00
705/35

* cited by examiner

*Primary Examiner* — Amresh Singh
(74) *Attorney, Agent, or Firm* — Morgan, Lewis & Bockius LLP

(57) ABSTRACT

A method for quantifying performance of a group includes generating historical group factor performance data for a plurality of predefined factors in accordance with historical performance data and historical group factor exposure data for the plurality of predefined factors; generating historical group static factor performance data for the plurality of predefined factors in accordance with the historical performance data for the plurality of predefined factors and one or more representative values of the historical group factor exposure data for the plurality of predefined factors; generating historical group dynamic factor performance data for the plurality of predefined factors in accordance with the historical group factor performance data for the plurality of predefined factors and the historical group static factor performance data for the plurality of predefined factors; and providing one or more values that represent the historical group dynamic factor performance data.

20 Claims, 19 Drawing Sheets

Group and Agent Screening

[ New Screen ]  [ Load Screen ]  [ Save Screen ]

Geography:  US

Screen for:  Coiled tubing drillers

Performance benchmark:  All drilling contractors

Where:

| | |
|---|---|
| Expense | < $5,000/day |
| History | > 5 years |
| ßPerformance (factor timing annual failure rate) | < 2.00 % |
| ßScore (factor timing failure rate confidence) | < 10% |
| aPerformance (residual annual failure rate) | < 1.00 % |
| aScore (residual annual failure rate confidence) | < 5% |
| aPerformance - 1,000 horsepower rig sub-set | < 2.00 % |

[ Add Condition ]

[ Run Screen ]

Figure 5

1316 Subsequent to generating the historical group dynamic factor performance data, determine one or more values that indicate reliability of the historical group dynamic factor performance data; and provide the one or more values that indicate reliability of the historical group dynamic factor performance data.

1318 Generate historical group residual performance data for the respective group in accordance with the historical group performance data for the respective group and the historical group factor performance data for the plurality of predefined factors for the respective group. A respective entry in the historical group residual performance data represents member selection performance associated with the respective group. Provide one or more values that represent the historical group residual performance data.

1320 Determine one or more values that indicate reliability of the historical group residual performance data. Provide one or more values that indicate reliability of the historical group residual performance data.

1322 Determine one or more combined values from the historical group dynamic factor performance data and the historical group residual performance data, a respective combined value, of the one or more combined values, corresponding to a sum of one or more respective values in the historical group dynamic factor performance data and one or more corresponding values in the historical group residual performance data. Provide at least a subset of the one or more combined values.

1324 Identify a plurality of groups associated with a respective agent. The plurality of groups includes the respective group. Generate historical group dynamic factor performance data for the plurality of predefined factors for particular groups of the plurality of groups. Provide one or more values that represent the historical group dynamic factor performance data for the plurality of predefined factors for the particular groups of the plurality of groups.

1326 The one or more values that represent the historical group dynamic factor performance data for the plurality of predefined factors for the particular groups of the plurality of groups are provided in response to a request to quantify factor timing performance of the respective agent

Figure 13C

1328 Identify a plurality of groups associated with a respective agent. The plurality of groups includes the respective group. Generate historical group residual performance data for particular groups in the plurality of groups. Provide one or more values that represent the historical group residual performance data for the particular groups of the plurality of groups.

1330 The one or more values that represent the historical group residual performance data for the particular groups of the plurality of groups are provided in response to a request to quantify member selection performance of the respective agent 1332 A first group of the plurality of groups spans over a first time period and a second group of the plurality of groups spans over a second time period distinct from the first time period 1334 Identify a respective range based on the historical group factor exposure data for a respective factor. Determine whether a current group factor exposure for the respective factor is outside of the respective range for the respective factor. In accordance with a determination that the current group factor exposure for the respective factor is outside of the respective range for the respective factor, provide a notification indicating that the current group factor exposure for the respective factor is outside the respective range for the respective factor.

1336 Display a graph representing entries in the historical group factor exposure data for a second factor and entries in the historical performance data of the second factor. The graph includes a plurality of data points, a respective data point having a first axis value that corresponds to a respective entry in the historical group factor exposure data for the second factor and a second axis value that corresponds to a corresponding entry in the historical performance data of the second factor.

1338 Generate historical group residual performance data for a subset of the respective group in accordance with historical group performance data for the subset of the respective group and the historical group factor performance data for the subset of the respective group. A respective entry in the historical group residual performance data represents residual member selection performance associated with the subset of the respective group

Figure 13D

1340 Generate historical group residual performance data for a first group. The first group includes members in the respective group and the members in the first group have same weights as each other. Provide one or more values that represent the historical group residual performance data for the first group.

1341-1 Generate historical group residual performance data for a subset of the respective group in accordance with historical group performance data for the subset of the respective group and the historical group factor performance data for the subset of the respective group. A respective entry in the historical group residual performance data represents residual member selection performance associated with the subset of the respective group. Generate expected residual performance data for the subset of the respective group in accordance with one or more of the historical group residual performance data for the respective group, the historical group residual performance data for the subset of the respective group, a difference of the historical group residual performance data for the subset of the respective group and historical group residual performance data for a first group, and current group factor exposure data for the subset of the respective group. The first group includes members in the respective group and the members in the first group have same weights as each other. Store the expected residual performance data for the subset of the respective group.

1341-2 Repeat generating expected residual performance data for distinct subsets of the respective group. Generate expected residual performance data for the respective group in accordance with the expected residual performance data for the distinct subsets of the respective group. Store the expected residual performance data for the respective group.

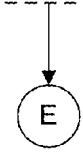

Figure 13E

1342 The historical group factor exposure data is determined in accordance with historical member factor exposure data and historical group member exposure data 1344 Display a first chart selected from a set of charts that include: a chart that includes a plurality of first data points, a respective first data point corresponding to a distinct group or a set of groups, the respective first data point having a first axis value that represents one of: the historical group dynamic factor performance data for the distinct group or the set of groups and a value that indicates reliability of the historical group dynamic factor performance data and a second axis value that represents one of: the historical group residual performance data for the distinct group or the set of groups and a value that indicates reliability of the historical group residual performance data; a chart that illustrates a two-dimensional matrix of cells, wherein one of a column of cells or a row of cells corresponds to a respective time period and the other of the column of cells and the row of cells corresponds to a distinct group or a set of groups, and a respective cell of the cells corresponds to one of: the respective entry in the historical group dynamic factor performance data, the respective entry in the historical group residual performance data, a value that represents cumulative historical group dynamic factor performance data for a predefined set of periods, a value that represents cumulative historical group residual performance data for a predefined set of periods, a respective combined value corresponding to a sum of one or more respective values in the historical group dynamic factor performance data and one or more corresponding values in the historical group residual performance data; a correlation chart that illustrates a two-dimensional matrix that graphically represents correlation of performances of a plurality of groups, wherein the correlation is determined based on one or more of: the historical group dynamic factor performance data for respective groups or respective sets of groups, and the historical group residual performance data for the respective groups; and a dendrogram that graphically illustrates clustering of performances of the plurality of groups, wherein the clustering is determined based on one or more of: the historical group dynamic factor performance data for respective groups, and the historical group residual performance data for the respective groups. Concurrently display one or more user interface elements with the first chart. While displaying the first chart and the one or more user interface elements, detect a selection of one of the one or more user interface elements. Replace the display of the first chart with a display of a second chart. The second chart is selected from the set of charts and the second chart is distinct from the first chart.

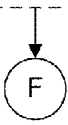

Figure 13F

1346 Generate expected dynamic factor performance data for a respective factor in accordance with the historical group dynamic factor performance data and current group factor exposure data for the respective group for the respective factor. Store the expected dynamic factor performance data for the respective factor.

1348 Repeat generating expected dynamic factor performance data for distinct factors of the respective group. Generate expected dynamic factor performance data for the respective group in accordance with the expected dynamic factor performance data for the distinct factors. Store the expected aggregate dynamic factor performance data for the respective group.

Figure 13G

SYSTEMS AND METHODS FOR AUTOMATED ANALYSIS, SCREENING AND REPORTING OF GROUP PERFORMANCE

RELATED APPLICATIONS

This application claims priority to U.S. Provisional Patent Application Ser. No. 61/861,236, filed Aug. 1, 2013 and U.S. Provisional Patent Application Ser. No. 61/884,950, filed Sep. 30, 2013, both of which are incorporated by reference herein in their entirety.

TECHNICAL FIELD

The disclosed embodiments relate generally to analyzing performance of an entity (e.g., a machine). More particularly, the disclosed embodiments relate to methods and systems for automatically analyzing performance of a group of entities (e.g., a group of machines).

BACKGROUND

Increasingly more people analyze performance of entities (e.g., machines) using quantitative tools, computer methods, and computer systems. The performance of an entity is frequently expressed as a change in the value of a particular property of an entity over a certain period (e.g., failure rate of machines).

However, with respect to a group of entities (e.g., a group of machines), it is difficult to accurately represent the performance of the group using conventional tools. Therefore, there is a need for a new method and system for analyzing performances of groups of entities.

SUMMARY

In particular, conventional tools typically measure the performance of a group based on whether a particular property of the group has increased or decreased. However, the conventional tools do not indicate why the value of a particular property of the group has increased or decreased. This has led some agents to take unreasonable actions to manage the value of a particular property of the group (e.g., making exclusive use of new machines that have a low chance of failure when use of older machines may be more economical, making use of mechanical procedures that have a low chance of failure but may be more costly), because conventional tools do not adequately indicate the sources of the performance of those agents, or groups of entities managed by those agents. In addition, conventional tools do not identify whether the value of a group of entities increased due to an intrinsic property of this group, the skill of an agent managing the group, or due to a pure luck.

A number of embodiments (e.g., of systems, and methods of operating such systems) that overcome the limitations and disadvantages described above are presented in more detail below. These embodiments provide methods, systems, and graphical user interfaces (GUIs) for analyzing performances of groups.

As described in more detail below, some embodiments involve a computer-implemented method that includes receiving, at a computer system with one or more processors and memory, a request to quantify factor timing performance associated with a respective group; obtaining, at the computer system, historical performance data for a plurality of predefined factors; and obtaining, at the computer system, historical group factor exposure data for the plurality of predefined factors for the respective group. A respective entry in the historical group factor exposure data represents a relationship between a respective entry in historical performance data of the respective group and a respective entry in historical performance data of a respective factor of the plurality of predefined factors for a respective time period. The method also includes generating, at the computer system, historical group factor performance data for the plurality of predefined factors for the respective group in accordance with the historical performance data for the plurality of predefined factors and the historical group factor exposure data for the plurality of predefined factors for the respective group; and generating, at the computer system, historical group static factor performance data for the plurality of predefined factors for the respective group in accordance with the historical performance data for the plurality of predefined factors and one or more representative values of the historical group factor exposure data for the plurality of predefined factors for the respective group; and generating, at the computer system, historical group dynamic factor performance data for the plurality of predefined factors for the respective group in accordance with the historical group factor performance data for the plurality of predefined factors for the respective group and the historical group static factor performance data for the plurality of predefined factors for the respective group. A respective entry in the historical group dynamic factor performance data represents the factor timing performance associated with the respective group for a respective factor for a respective time period. The method further includes providing one or more values that represent the historical group dynamic factor performance data.

A computer system includes one or more processors for executing programs and memory storing one or more programs for execution by the one or more processors. The one or more programs include instructions executed by the one or more processors so as to perform any of the embodiments of the aforementioned method.

A computer readable storage medium stores one or more programs configured for execution by one or more processors of a computer system. The one or more programs include instructions for performing any of the embodiments of the aforementioned method.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

FIG. 5 illustrates an example of a group screening interface in accordance with some embodiments.

FIGS. 13A-13G are flow charts representing a method of quantifying performance of a group in accordance with some embodiments.

Like reference numerals refer to corresponding parts throughout the drawings.

DESCRIPTION OF EMBODIMENTS

Methods and systems for analyzing performances of groups are described. Reference will be made to certain embodiments, examples of which are illustrated in the accompanying drawings. It will be understood that the embodiments are not intended to limit the scope of claims to these particular embodiments alone. On the contrary, the claims are intended to cover alternatives, modifications and equivalents that are within the spirit and scope of the described principles as defined by the appended claims.

Moreover, in the following description, numerous specific details are set forth to provide a thorough understanding of the embodiments. However, it will be apparent to one of ordinary skill in the art that the claimed features may be implemented without these particular details. In other instances, methods, procedures, components, and networks that are well-known to those of ordinary skill in the art are not described in detail to avoid obscuring aspects of the claimed features.

It will also be understood that, although the terms first, second, etc. may be used herein to describe various elements, these elements should not be limited by these terms. These terms are only used to distinguish one element from another. For example, a first factor could be termed a second factor, and, similarly, a second factor could be termed a first factor, without departing from the scope of the present invention. The first factor and the second factor are both contacts, but they are not the same factors.

The terminology used in the description of the embodiments herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting (the stated condition or event)" or "in response to detecting (the stated condition or event)," depending on the context.

Components

Figure 1:
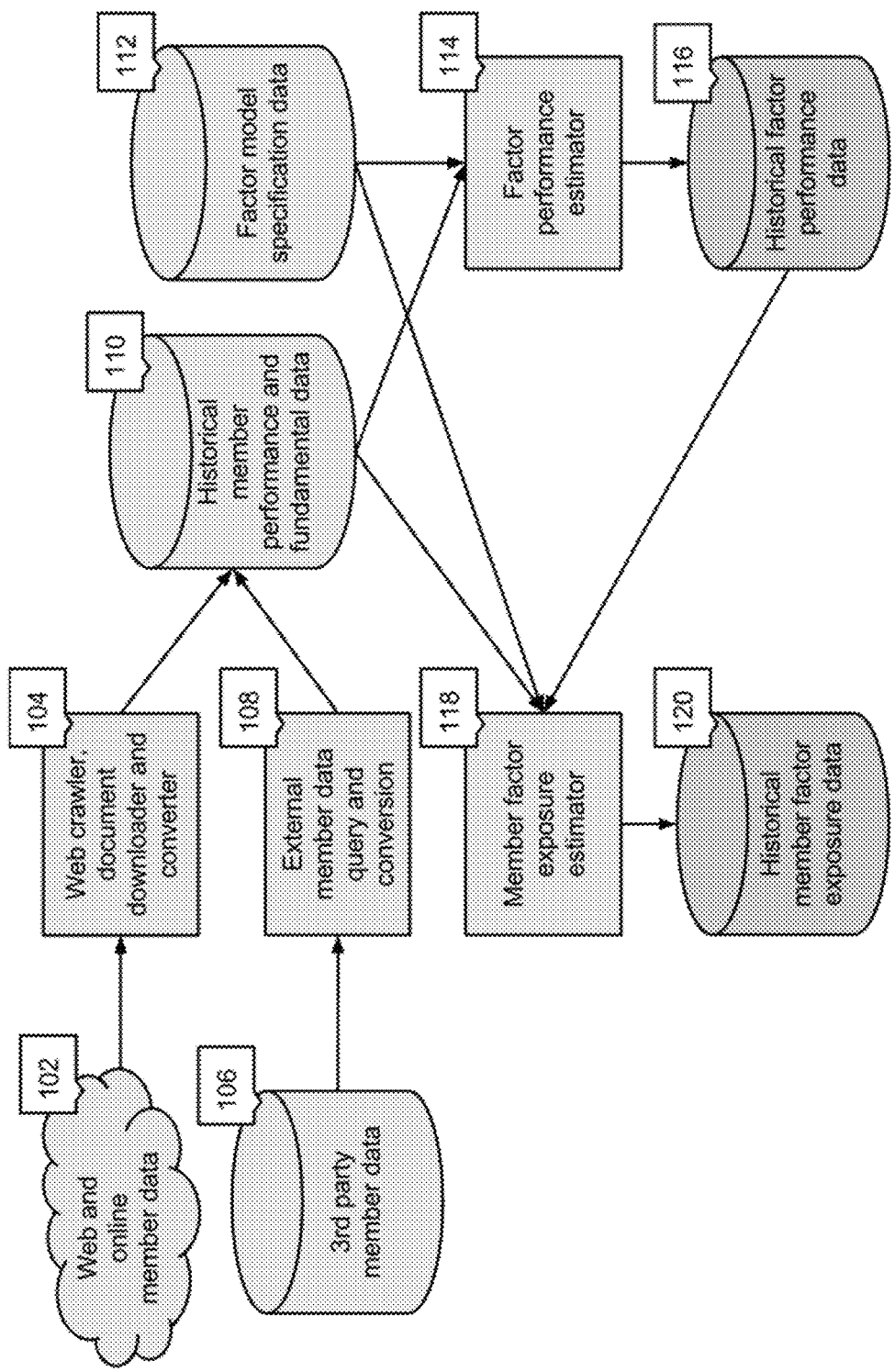
FIG. 1 is a block diagram illustrating a process flow diagram of historical factor exposure and factor performance data estimation components of a computer system in accordance with some embodiments.

FIG. 1 illustrates a process flow diagram of historical factor exposure and factor performance data estimation components of a computer system in accordance with some embodiments. The following are illustrated in FIG. 1:

Member data 102 processed by a web crawler, document downloader and converter 104;

Web crawler, document downloader and converter 104 processing member data 102 to generate historical member performance and fundamental data 110;

Third party member data 106 processed by an external member data query and conversion module 108;

External member data query and conversion module 108 processing third party member data 106 to generate historical member performance and fundamental data 110;

Historical member performance and fundamental data 110 populated by web crawler, document downloader and converter 104 and external member data query and conversion module 108, used by factor performance estimator 114 and member factor exposure estimator 118;

Factor model specification data 112 used by factor performance estimator 114 and member factor exposure estimator 118;

Factor performance estimator 114, processing historical member performance and fundamental data 110 according to factor model specification data 112 to generate historical factor performance data 116;

Historical factor performance data 116, generated by factor performance estimator 114 and used by member factor exposure estimator 118;

Member factor exposure estimator 118, processing historical member performance and fundamental data 110 as well as historical factor performance data 116 according to factor model specification data 112 to generate historical member factor exposure data 120; and Historical member factor exposure data 120, generated by member factor exposure estimator 118.

Figure 2:
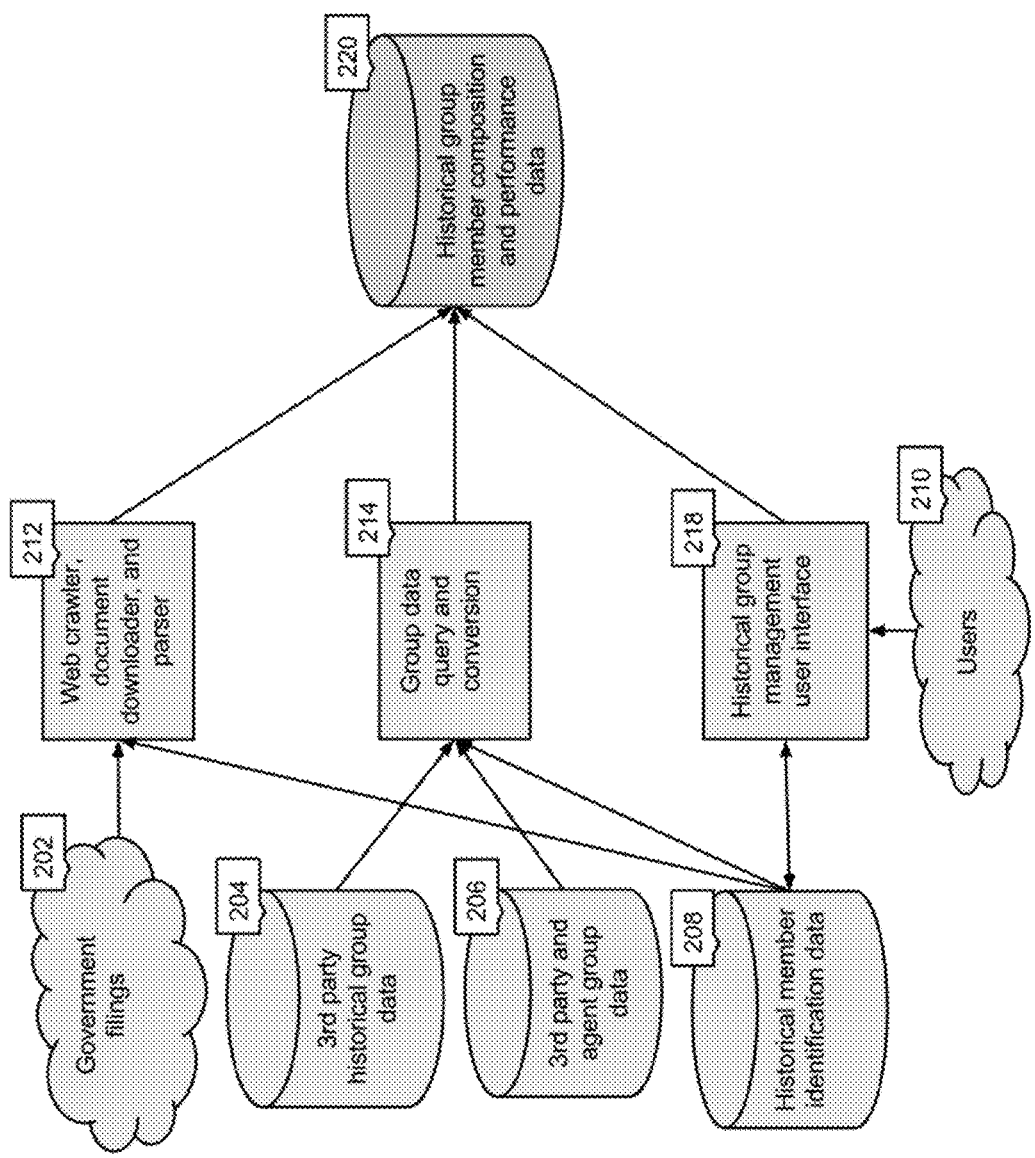
FIG. 2 is a block diagram illustrating a process flow diagram of historical group member composition and performance data collection components of a computer system in accordance with some embodiments.

FIG. 2 illustrates a process flow diagram of historical group member composition and performance data collection components of a computer system in accordance with some embodiments. The following are illustrated in FIG. 2:

Government filings 202, processed by web crawler, document downloader, and parser 212;

Third party historical group data 204, processed by group data query and conversion engine 214;

Third party and agent group data 206, processed by group data query and conversion engine 214;

Historical member identification data 208, used by web crawler, document downloader, and parser 212, group data query and conversion engine 214 and historical group management user interface (UI) 218, which updates historical group member composition and performance data 220 in some embodiments;

Users 210 (which is included for illustration purposes only and does not form any part of the computer system), accessing historical group management user interface 218;

Web crawler, document downloader, and parser 212 using historical member identification data 208 to process government filings 202 and generate historical group member composition and performance data 220;

Group data query and conversion engine 214, using historical member identification data 208 to process third party historical group data 204 and third party and agent group data 206 to generate historical group member composition and performance data 220;

Historical group management user interface 218, using and updating historical member identification data 208 and receiving inputs from, and providing information to, users 210 to generate historical group member composition and performance data 220; and Historical group member composition and performance data 220, generated by web crawler, document downloader, and parser 212, group data query and conversion engine 214 and/or historical group management user interface 218.

Figure 3:
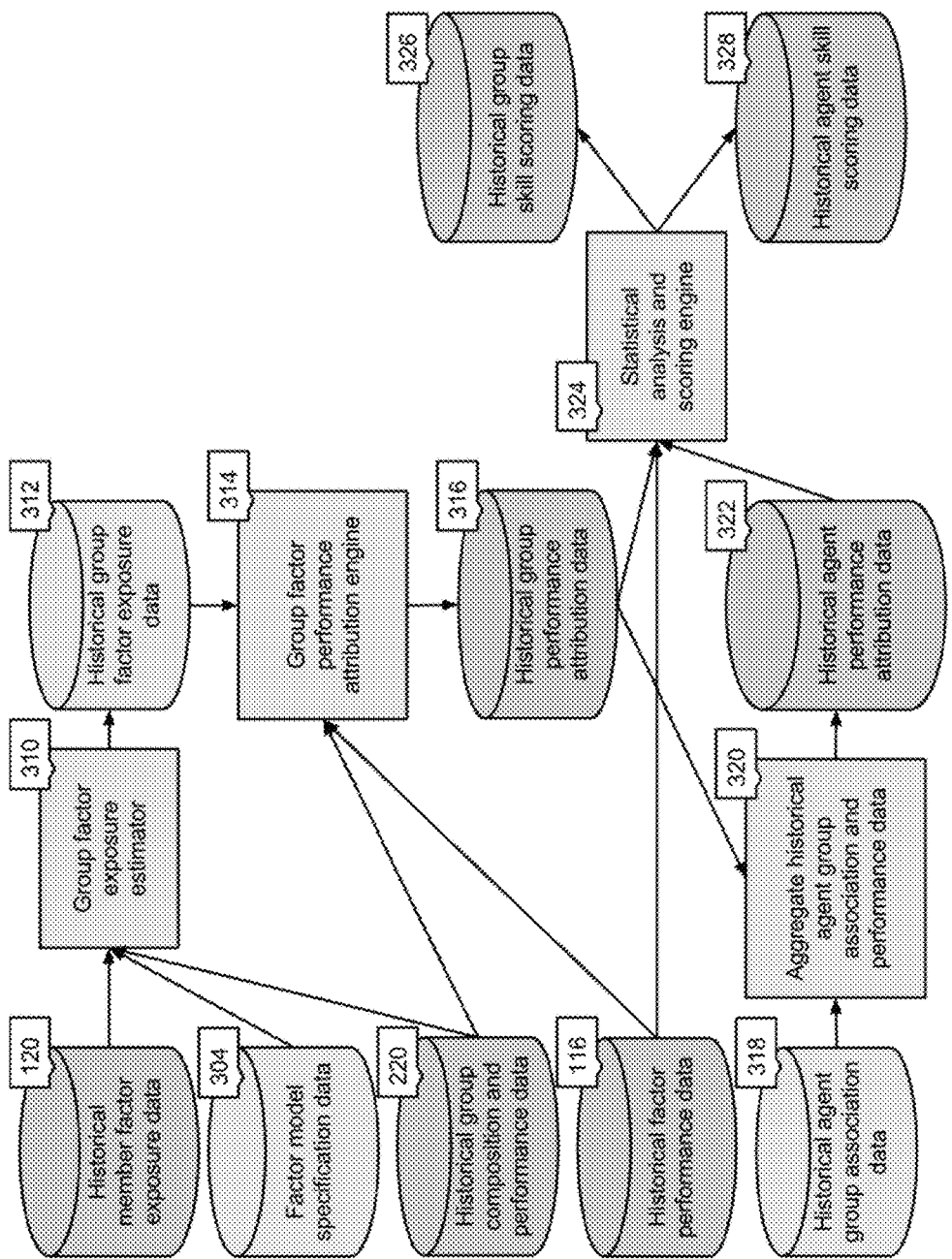
FIG. 3 is a block diagram illustrating a process flow diagram of historical group and agent performance attribution and skill scoring data estimation components of a computer system in accordance with some embodiments.

FIG. 3 illustrates a process flow diagram of historical group and agent performance attribution and skill scoring data estimation components of a computer system in accordance with some embodiments. The following are illustrated in FIG. 3:

Historical member factor exposure data 120, processed by group factor exposure estimator 310;

Factor model specification data 304, used by group factor exposure estimator 310;

Historical group composition and performance data 220, used by group factor exposure estimator 310 and group factor performance attribution engine 314;

Historical factor performance data 116, used by group factor performance attribution engine 314 and statistical analysis and scoring engine 324;

Group factor exposure estimator 310, generating historical group factor exposure data 312 using historical member factor exposure data 120, factor model specification data 304 and historical group composition and performance data 220;

Historical group factor exposure data 312, generated by group factor exposure estimator 310 and used by group factor performance attribution engine 314;

Group factor performance attribution engine 314, using historical group factor exposure data 312, historical group composition and performance data 220, and historical factor performance data 116 to calculate historical group performance attribution data 316;

Historical group performance attribution data 316, calculated by group factor performance attribution engine 314 and used by aggregator of historical agent group association and performance data 320 and statistical analysis and scoring engine 324;

Historical agent group association data 318, used by aggregator of historical agent group association and performance data 320;

Aggregator of historical agent group association and performance data 320, using historical agent group association data 318 and historical group performance attribution data 316 to generate historical agent performance attribution data 322;

Historical agent performance attribution data 322, generated by aggregator of historical agent group association and performance data 320 and used by statistical analysis and scoring engine 324;

Statistical analysis and scoring engine 324, using historical factor performance data 116, historical group performance attribution data 316, and/or historical agent performance attribution data 322 to generate historical group skill scoring data 326 and/or historical agent skill scoring data 328;

Historical group skill scoring data 326, generated by statistical analysis and scoring engine 324; and Historical agent skill scoring data 328, generated by statistical analysis and scoring engine 324.

Figure 4:
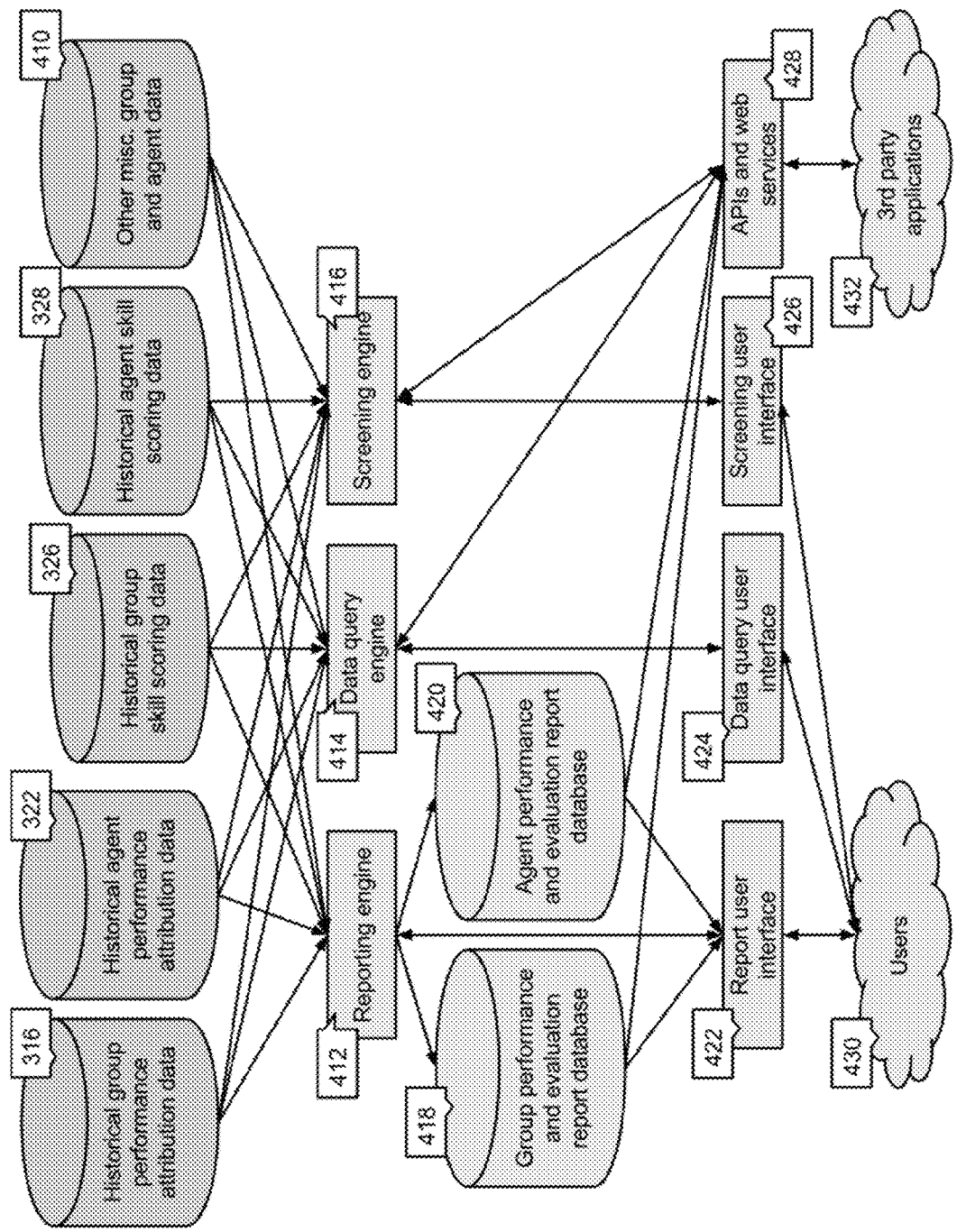
FIG. 4 is a block diagram illustrating a process flow diagram of user and application interfaces to data generated by a computer system in accordance with some embodiments.

FIG. 4 illustrates a process flow diagram of user and application interfaces to data generated by a computer system in accordance with some embodiments. The following are illustrated in FIG. 4:

Historical group performance attribution data 316, historical agent performance attribution data 322, historical group skill scoring data 326, historical agent skill scoring data 328 and other miscellaneous group and agent data 410 (collectively, system data), accessed by reporting engine 412, data query engine 414, and screening engine 416;

Reporting engine 412, processing the system data to populate group performance and evaluation report database 418 and agent performance and evaluation report database 420, accessed by reporting user interface 422 to define and provide custom reports;

Data query engine 414, used by data query user interface 424 and APIs and web services 428 to access the system data;

Screening engine 416, used by screening user interface 426 and APIs and web services 428 to access the system data and filter data for groups and agents meeting various criteria;

Group performance and evaluation report database 418, populated by reporting engine 412 and used by report user interface 422 and APIs and web services 428 allowing saving and caching of reports;

Agent performance and evaluation report database 420, populated by reporting engine 412 and used by report user interface 422 and APIs and web services 428 allowing saving and caching of reports;

Report user interface 422, providing users 430 access to reports from group performance and evaluation report database 418 and agent performance and evaluation report database 420 and receiving inputs from users 430 to define custom reports;

Data query user interface 424, providing users 430 access to data query engine 414;

Screening user interface 426, providing users 430 access to screening engine 416;

APIs and web services 428, providing third party applications 432 access to group performance and evaluation report database 418, agent performance and evaluation report database 420, data query engine 414, and screening engine 416;

Users 430 (which is included for illustration purposes only and does not form any part of the computer system), accessing report user interface 422, data query user interface 424, and screening user interface 426 and receiving data therefrom; and Third party applications 432, accessing APIs and web services 428 and receiving data therefrom.

Although FIGS. 1-4 illustrate particular aspects of a computer system with certain components, a person having ordinary skill in the art would understand that the computer system may include a subset, or a superset, of the illustrated components.

Operations

In some embodiments, a computer system operates using a set of factor models. The set of factor models includes historical factor performance data 116 and historical member factor exposure data 120. Historical factor performance data 116 may be stored as time series of performances and the statistics associated with such performance data for each model factor provided. Historical member factor exposure data 120 may be stored as time series of exposures for each member supported to each model factor provided and applicable to the member.

In some embodiments, factor model data 116 and 120 is generated as follows. Member data 102 and 106 are queried, processed and converted by modules 104 and 108 to produce historical member performance and fundamental data 110. Historical member data 110 contains all the information necessary to estimate factor performances 116 and historical member factor exposure data 120 for the models defined by factor model specification data 112. Factor model specification data 112 define how factor performances and exposures are to be calculated for each model. For example, in some implementations, a factor model specification in factor model specification data 112 defines that the model consists of a single factor. Factor performance for a given period is obtained by calculating a composite performance of all members using weighting. In this case, database 110 is queried by factor performance estimator 114 for performance and weights for members in each estimation period. Factor performance estimator 114 combines historical member performance data 110 according to the specification in factor model specification data 112 to produce historical factor performance data 116. For instance, a factor model specification in factor model specification data 112 may include sector factors. A sector factor corresponds to a plurality of members. In some cases, factor performance estimator 114 calculates weighted average historical performances for members in this sector using historical member performance and fundamental data 110. Member factor exposure estimator 118 combines historical member performance data 110 and, for models that require it, historical factor performance data 116, according to a specification in factor model specification data 112 to produce historical member factor exposure data 120. In case statistical factor models are used, this process typically involves performing a regression analysis for member performances against factor performances. The regression coefficients from the regression analysis yield values stored in member factor exposure data 120.

In some embodiments, a computer system processes collection of historical group member composition and performance data 220. Historical group member composition and performance data 220 may be stored as a time series of group composition and performances or a collection of tables or documents containing group composition and performance data for each observation period. Historical group member composition data 220 may be generated from a query and processing of regulatory filings 202 using web crawler, downloader, and parser 212. Web crawler, downloader, and parser 212 may be implemented in a high-level extraction and reporting language such as Perl or Python. Web crawler, downloader, and parser 212 downloads the index of regulatory filings for a group, downloads all the individual filings, parses them to extract the group information, and updates historical group member composition and performance data 220. Third party historical group data 204 and third party and agent group data 206 may be converted by module 214 to match the format of historical group member compositions and performance data 220. This allows integration with existing third party and agent group tracking and management systems. Users 210 can use management interface 218 to directly enter and manage historical group information 220. This may be used by users to analyze sub-components of their overall group or model groups. Historical member identification data 208 is used by parser 212, converter 214, and interface 218 to allow identification of, and reference to, members using multiple symbols, and names, since a member may have aliases in government filings and composition reports.

In some embodiments, the analysis, reporting, and screening of group and agent performance relies on historical group performance attribution data 316 and historical agent performance attribution data 322. For a given factor model specification from the collection 304, historical group compositions 220 (also called herein group member exposures) are combined with historical member factor exposure data 120 (also called herein member factor exposures) by the group exposure estimator 310 to yield historical group factor exposure data 312. In some embodiments, group factor exposures or group active factor exposures active exposures relative to a group benchmark may be used. Historical group factor exposure data 312 (also called herein group factor exposures) may be stored in a variety of formats, such as time series of exposures for each group covered by the system to each model factor applicable to the members in the group, as a collection of vectors of exposures for each group to model factors in a given observation period, or any alternative method encompassing the same information.

In some embodiments, historical group factor exposure data 312, historical group composition and performance data 220, and historical factor performance data 116 (also called herein factor performances) are processed by the performance attribution engine 314 to generate historical group performance attribution data 316. In some embodiments, the group performance includes residual performances and static and dynamic performances for all defined factors. In some embodiments, this data also includes group allocation performance and group selection performance.

In some cases, an agent may be involved in the management of multiple groups simultaneously and/or over history. An association among an agent and historical groups is stored in historical agent group association database 318. Database 318 may be implemented as a table with an entry for each group and agent managing that group over a given period. Data in database 318 may be combined with information in historical group performance attribution data 316 by aggregator 320 to yield historical agent performance attribution data 322. A particular version of aggregator 320 may be implemented as:

For each measurement period p and agent M, using the data in database 318 identify the set of all groups P managed by M during p.

Retrieve the set of performance attribution data for P from data 316 containing all of the defined performance components.

Calculate composite performance attribution for M over p as a by-element weighted-average of all performance attribution data.

An aggregate time series of performance attribution data is established by linking entries for each period p of an agent's history. The process results in historical agent performance attribution data 322 containing aggregate performance attribution components for each period p. A number of weighting and linking factors can be used for each period's data such as group value and equal weighting.

An alternative version of an aggregator 320 operates to construct a composite group for each measurement period p and perform attribution on the composite as follows. For each measurement period p and agent M, using data 318, identify the set of all groups managed by M during p. Create a composite group CP as a combination of all groups where individual members may be equal-weighted, value-weighted, or use an alternative weighting mechanism. Calculate historical agent performance attribution data 322 for CP. In some embodiments, historical agent performance attribution data 322 includes residual performances for all S in CP and static and dynamic performances for all defined factors.

In some embodiments, the calculated historical group 316 and agent 322 performance attribution data is processed by the statistical analysis and scoring engine 324 using historical factor performance data 116 to generate historical group 326 and agent 328 skill scoring data. In both cases of group and agent performances, the inputs to statistical analysis and scoring engine 324 include a set of factor and residual member performances realized by the group or agent for each observation period (e.g., all components of group active performance) as well as the dispersion measures of such sources of performance. The engine estimates the excess performance, if any, generated by these performance sources over the observation period and statistical significance of the excess performance estimates (e.g., evidence of member selection and/or factor timing skills). For each component of performance attribution (static factor exposures, dynamic factor exposures, or residual member exposures), the following process may be performed to determine statistical significance. First, calculate the realized group performance due to static factor exposures, dynamic factor exposures, or residual member exposures (also called herein group factor static performances, group factor dynamic performances, or member residual performances). Second, calculate the expected performance due to static factor exposures (also called herein group factor static performances, group passive performances, or group factor passive performances), dynamic factor exposures, or residual member exposures. In some embodiments, the expected performance due to static factor exposures is the group performance and the expected performance due to dynamic factor exposures and residual member exposures is zero. Third, calculate the excess performance due to static factor, dynamic factor, or residual member exposures (also called herein group static factor performances, group dynamic factor performances, or member residual performances). Fourth, perform a statistical test T to reject the null hypothesis H0 that excess performance is zero. If H0 is rejected and estimated excess performance is greater than 0 with statistical significance, then a corresponding agent is deemed to be skilled in dynamically timing factor(s) or selecting members generating positive residual performances. In some embodiments, a t-test is performed to test the hypothesis H0. In some embodiments, tests that do not rely on the normal distribution of excess performances are performed to test the hypothesis H0. In some embodiments, Bayesian inference is used to test whether the region of practical equivalence for 0 excess performance lies outside the highest density interval of the posterior distribution for a particular confidence level. In some embodiments, an alternative approach is used to evaluate factor timing skills. This approach focuses on a linear relationship between initial group exposure to factor F and period performance for the factor F. If a significantly positive relationship exists, the agent is deemed to be skilled in timing factor F by increasing exposure to the factor F prior to periods where it generates higher than average performance. In these embodiments, statistical significance of the relationship can be tested by an F-test of the overall fit and/or t-tests of individual parameters. In some embodiments, the excess performance data (group factor dynamic performances and member residual performances) and the data associated with the statistical test such as the test statistics and confidence levels are stored in data 326 or data 328.

For the test T, either ex-ante or ex-post dispersion metrics of excess performance data may be used. The simplest form of this is the forecasted (for ex-ante) and realized (ex-post) standard deviation. A variety of statistics or tests can be employed to produce more robust results than those obtained from simple average and standard deviation metrics, particularly for members with non-normal performance distributions.

Historical group 326 and agent 328 skill scoring data generated by 324 may also include any of the standard performance ratios and metrics such as the reward-to-variability ratio and the Information Ratio generated by exposure to individual factors and residual member risk. This data may provide users with a familiar format for the presentation of more granular data than group-level ratios.

For the purposes of presenting individual users with a simplified picture of sources of active performance and their significance, beta-performance and beta-score are defined for the factor timing of the group and agent as a whole and each factor that groups and agents have been exposed to. Alpha-performance and alpha-score are similarly defined for the member selection performance of the group and agent as a whole and each member group, such as sector, that can be identified for members included in historical groups and agents have been exposed to. These values are calculated by statistical analysis and scoring engine 324. As used herein, beta-performance refers to a group factor timing performance for a particular factor or factors. As used herein, beta-score refers to a confidence level that factor timing skills exist for a particular factor or factors. As used herein, alpha-performance refers to a residual performance of a particular set of members. As used herein, alpha-score refers to a confidence level that selection skills exist for a particular set of members.

In some embodiments, the totality of the data produced by the system is made available to Users 430 and third party applications 432. The data available via reporting 422, query 424 and screening 426 user interfaces as well as APIs and web services 428 (externally available system data) includes historical group performance attribution data 316, agent performance attribution data 322, group skill scoring data 326, agent skill scoring data 328 and miscellaneous group and agent data 410 that may be relevant for reports and queries. Reporting engine 412 processes the externally available system data to generate group and agent performance and evaluation reports, which can be stored in databases 418 and 420 for caching and efficient distribution on duplicate requests. Reports may be generated to focus on factor and idiosyncratic performances for specific sources such as individual factors, industries, geographies and size groupings. Reports may be generated to identify and focus on areas of factor timing and member selection with significant positive or negative performances or evidence of skill. Reporting engine 412 may offer a comparison among sources of group or agent performance over history, and the evaluation of skill evolution over history. Reporting engine 412, data query engine 414, and screening engine 416 (the engines) may provide access to an objective or quantitative data on group or agent style (defined as factor exposure profile) throughout group or agent history. The engines may also provide an identification of group or agent style drift (change in factor exposure profile) or identify when group factor exposure profile is materially different from historical norms and outside the range consistent with past performance.

In some embodiments, data query engine 414 provides access to the externally available system data for the data query user interface 424 and application programming interfaces (APIs) and web services 428.

In some embodiments, screening engine 416 exposes APIs that can be used by the screening user interface 426 and external APIs and web services 428 to filter for groups, agents, and any other externally available system data matching specific criteria. In the most general case where externally available system data is stored in one or more SQL databases, the screening engine 416 allows execution of SELECT SQL queries spanning the fields of such databases.

In some embodiments, screening user interface 426 provides users 430 with the ability to build search queries (screens) spanning the fields of externally available system data using an intuitive graphical interface that does not require the knowledge of SQL or APIs. A sample interface showing a user-created screen is provided on FIG. 5. Using the interface shown in FIG. 5, users have the ability to create, load and save searches of groups and agents, including agent searches spanning data from multiple groups associated with a particular agent. The interface allows users to select the entities to be searched for as well as the performance metrics that matched entities must satisfy. In the example shown in FIG. 5, a user chose to search for US coiled tubing drillers using the performance of all drillers as the performance benchmark for the evaluation. Multiple conditions can be added to the searches. Each condition consists of a name of an externally available system data field and a test that the data must satisfy. In the example shown in FIG. 5, seven conditions have been added including the magnitude and the statistical significance of the allocation or factor timing performances ($\beta$performance, $\beta$score), the magnitude and the statistical significance of the selection performances ($\alpha$performance, $\alpha$score) and the magnitude of the selection performance for the 1,000 horse power rigs sector ($\alpha$performance for the US coiled tubing drillers with 1,000 horse power rating). The screen will identify agents with estimated skills in factor timing, overall driller selection and selection of US coiled tubing drillers. Additional conditions can be added to further narrow the match set. In some embodiments, a user runs the screen receiving a set of matching entities for the search, if any, and can further investigate the matches by accessing their reports via the report UI 422 or accessing data via the data query UI 424.

In some embodiments, APIs and web services 428 provide access to external applications 432 to screening 416 and data query 414 engines as well as reports databases 418 and 420.

Several modules and engines may be combined or may share code to achieve a more efficient implementation. Common code from several modules can be extracted into shared libraries. For instance, web document downloader and parser 212 may be combined or share code with the group data query and conversion module 214.

Data can be stored in any of the common formats including delimited text files and SQL Tables. For optimal performance, all the user-accessible performance and scoring data should reside in storage that can be efficiently indexed and searched, such as a SQL database.

Data stored in multiple databases in the process flow charts may be combined in a single database for implementation and maintenance needs. For instance, some or all of the externally available data 316, 322, 326, 328 and 410 may be combined in a single database.

Not all of member data sources 102 and 106 may be needed by an implementation of the system. For instance, a system with access to comprehensive third party member data 106 may rely on third party member data 106 entirely.

Factor model specification 112 can consist of computer code capable of estimating factor performances 116 and exposures 120, when executed by one or more processors of a computer system, or a high-level description directing the sequence of modules and the flow of data among the modules of a computer system to enable such estimation.

Multiple factor models may be specified and supported by the system and all of the values, statistics, and scores described can be calculated for a variety of models. Fundamental factor models define factors and member exposures primarily via fundamental company properties. Statistical factor models define factors and member exposures primarily via statistical relationships among performance and other properties of various baskets of members. The system can support any combination of these approaches.

When estimating factor performances and member factor exposures via linear regression, multiple approaches can be used to limit the impact of outliers and overweight more recent observations. For instance, observations can be exponentially weighted to reduce the weighting of older data. Independent variables can also be weighted by the inverse of the regression residual to reduce the impact of outliers. Any other method of controlling the impact of outliers may be employed. The weighting factors, exponential decay factors, and the historical period over which regression data is collected can vary and may differ for various models. Models describing the performance of low-turnover groups will generally use longer histories and be updated less frequently than models describing the performance of high-turnover groups. In some embodiments, Bayesian linear regression (instead of the linear regression) is used for estimating member factor exposures.

Historical group member composition data 220 may be populated using a subset of the group data sources 202, 204, 206 and 208. For instance, an exemplary system may only process source data 206 using query and conversion module 214.

A variety of factor models may be used for performance attribution and evaluation. In some embodiments, sophisticated statistical models including principal components may be employed to identify the wide variety of systemic risks that may be taken. In some embodiments, a simpler fundamental or statistical model with a few sector and style factors may suffice. Users may have the ability to select the models used for performance analysis, reporting, and screening.

A variety of benchmarks may be used for performance reporting. Users may have the ability to select the benchmarks used for reporting, and screening. However, the benchmark does not affect the evaluation of factor timing or member selection skills.

Optionally, group factor performance attribution engine 314 may generate and include in the historical group performance attribution data 316 the Brinson Fachler attribution or any other commonly used performance attribution statistics. In some cases, arithmetic or geometric performance decomposition (performance compounding) may be used.

Historical group performance attribution data 316 may include all of the individual sub-components of a group or any values that can be used to estimate or derive this data. For instance, residual performances and group member exposures may be stored in place of residual performances.

Calculation of composite performance attribution for M over p (performance attribution data) may need to correct for the autoregressive aspects of member and factor performances when estimating factor and member volatility over longer periods via aggregation.

An alternative approach to developing a composite agent performance is to treat each group at period p as a set of independent factor and member and selection decisions, preserving individual group attribution data. In this approach, historical agent performance attribution data 322 may contain a set of group factor performances and group residual performances as well as their sub-components for each individual group in each observation period p. The potential advantage of this is a larger dataset for processing by the statistical analysis and scoring engine 324.

When estimating excess performances and confidence levels for factor and residual performances within statistical analysis and scoring engine 324, non-normal distributions can be used to correct for fat tails. Additional tests can be performed to detect and correct for heteroskedasticity, autocorrelation, and multicollinearity.

The statistical analysis and scoring engine 324 can identify members that are not linear and where residual performances are not well described by a normal distribution. In some embodiments, the engine 324 estimates the probability of the various outcomes given the distribution of the underlying members and the resulting probability of the various performance outcomes, for instance using a binary tree. The engine can then estimate the excess performance and confidence levels consistent with the non-normal and non-linear nature of the instrument.

The statistical analysis and scoring engine 324 can define and calculate values in addition to beta-performance, beta-score, alpha-performance and alpha-score that capture the excess performance of factor timing and member selection and the statistical significance of such excess performance to present users with a simplified picture of sources of active performance and their significance. These values can be given a variety of names for branding purposes or to improve their intuitive grasp by the users.

Historical agent performance attribution and skill scoring may not be implemented in development of a partial system providing performance attribution and evaluation for groups only. In this case, database 322 and 328 may not be implemented.

The user interfaces 422, 424 and 426 can be implemented for and distributed on any platform including but not limited to: Microsoft Windows, MacOS, or Unix desktops, Android or iOS mobile Operating Systems, and Web Browsers using web programming technologies such as HTML5 and Flash.

The reporting user interface 422 can generate textual, table, or graphical representation of all system data. For instance, performance attribution can be displayed in table or graphical form. Specific factor, group and agent performance attribution can be similarly displayed in graph form along the factor performance data. For example, scatter plots, distribution diagrams for various sources of active performances, and a number of additional approaches can be used to illustrate skill and/or positive bias in specific factor timing and member selection performances, for instance cumulative performance charts that illustrate the performances from timing specific factors over the history.

Group performance attribution and skill reports can be generated by the system based on a number of settings or configuration parameters which include the factor model used as well as other relevant variables. The reports provide simple and intuitive summary of the factor timing and member selection active performances in the form of the βPerformance and αPerformance values and the statistical significance of such active performances in the form of the βScore and αScore. Combined factor timing and member selection performances and their statistical significance can also be provided in the form of αβPerformance and αβScore, respectively. The selection and factor timing active performances can be presented as percentiles of peer performances (αPercentile and βPercentile, respectively) to offer easy comparison to the peers. Additional narrative can be generated to discuss the nature and the magnitude of any estimated skills in member selection and factor timing.

The user interfaces 422, 424 and 426 may be combined into one or more modules providing aggregation of user interface features.

FIG. 5 provides a sample of a possible implementation of the screening UI 426. A variety of UI designs and implementations are possible. The common characteristic of all search and screening interfaces is the ability to execute queries spanning fields of the databases containing externally available system information to generate a set of groups and agents meeting a given set of performance, skill evaluation and other conditions.

Not all interface modules are necessary for system operation. For instance, an implementation using only reporting and screening interfaces implemented for Web browsers using HTML5 is possible. Any subset of externally available system data being provided to users or applications via a subset of user interfaces and engines may be used.

Group and agent historical factor exposure profile (style) may be determined from the historical exposure and performance decomposition reports. In some embodiments, changes in this profile or group positioning outside of historic norms, commonly referred to as "style drift," are explicitly pointed out in the reports and screens.

In some embodiments, a graphical representation of the range of historical factor exposures is provided. In such embodiments, current exposures (style) are plotted against the distribution to provide a visual illustration of style consistency.

In addition to a visual illustration of style consistency or drift, in some embodiments, a numeric score is computed and provided as an objective measure of the difference (drift) of the current style away from the historical norms for the group or agent.

Figure 6:
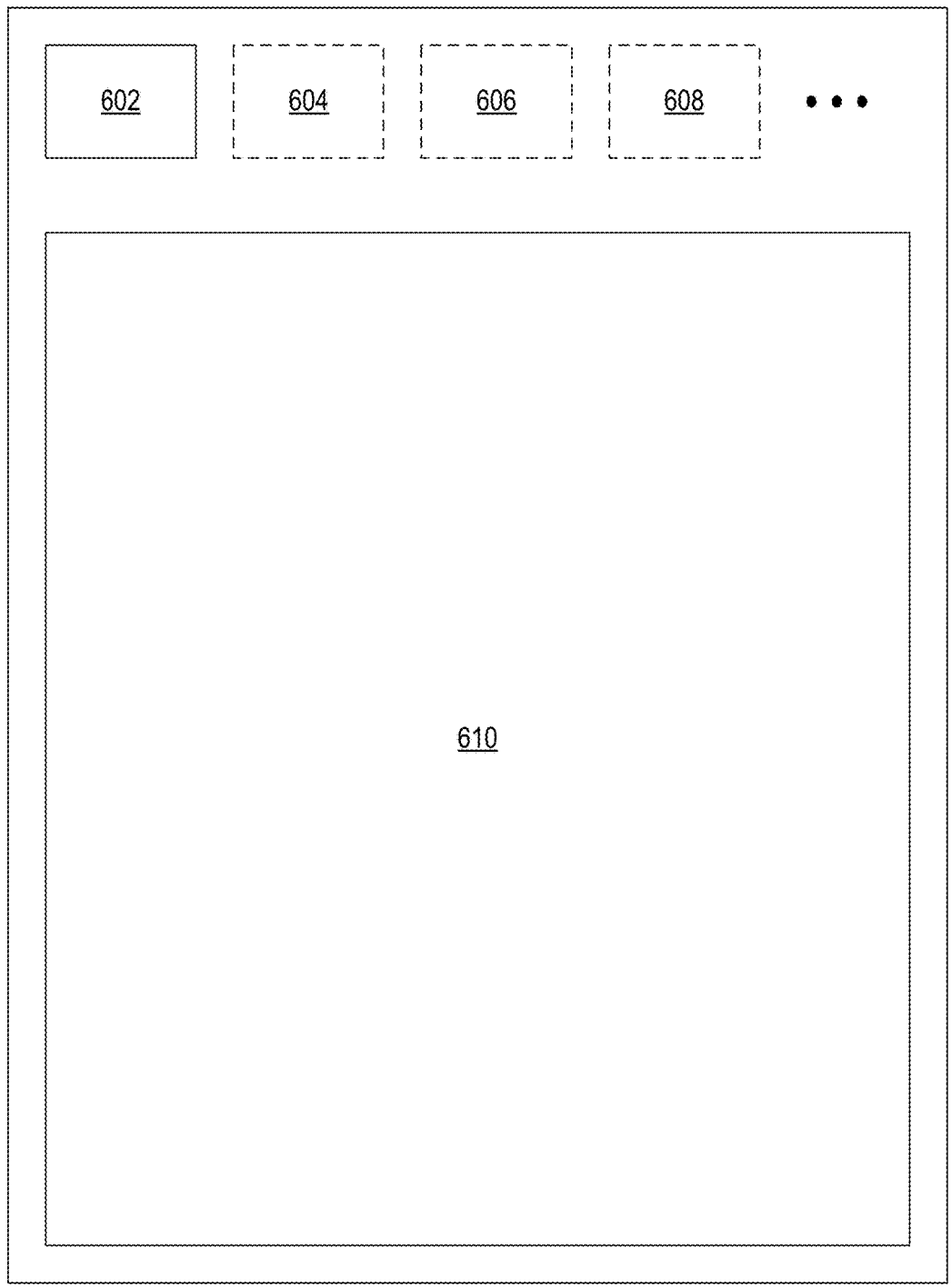
FIG. 6 illustrates an exemplary user interface in accordance with some embodiments.

FIG. 6 illustrates an exemplary user interface in accordance with some embodiments.

In FIG. 6, the user interface includes a display of a chart 610 and a concurrent display of one or more user interface elements (e.g., 602, 604, 606 and 608). In some embodiments, a respective user interface element corresponds to a respective chart. For example, in some embodiments, user interface element 602 corresponds to a chart shown in FIG. 7; user interface element 604 corresponds to a chart shown in FIG. 8; user interface element 606 corresponds to a chart shown in FIG. 9; and user interface element 608 corresponds to a chart shown in FIG. 10. In some other embodiments, the user interface includes more or fewer user interface elements. The correspondence between the user interface elements and charts may vary (e.g., user interface element 602 may correspond to a chart shown in FIG. 8 and user interface element 604 may correspond to a chart shown in FIG. 7, etc.).

In some embodiments, the respective user interface element, when selected (e.g., by a touch input on a touch-sensitive display or a mouse click), initiates a display of a corresponding chart in chart display region 610. As is evident from its name, chart display region 610 is configured to display a selected chart. For example, in some embodiments, user interface element 602, when selected, initiates a display of the chart shown in FIG. 7; user interface element 604, when selected, initiates a display of the chart shown in FIG. 8; user interface element 606, when selected, initiates a display of the chart shown in FIG. 9; and user interface element 608, when selected, initiates a display of the chart shown in FIG. 10. Thus, in some embodiments, while displaying a first chart, a selection of one of the one or more user interface elements is detected. In response to detecting the selection of one of the one or more user interface elements, the display of the first chart is replaced with a display of a second chart that is distinct from the first chart.

Figure 7:
FIG. 7 is a scatter plot that illustrates selected performance indicators of groups in accordance with some embodiments.

FIG. 7 is a scatter plot that illustrates selected performance indicators of groups in accordance with some embodiments.

The chart shown in FIG. 7 includes a plurality of data points. A respective data point corresponds to a distinct group. The respective data point has an x-axis value that corresponds to an alpha performance of the distinct group. The respective first data point has a y-axis value that corresponds to a beta performance of the distinct group.

In some embodiments, the alpha performance of the distinct group corresponds to an average group residual performance of the distinct group over one or more time periods. In some embodiments, the beta performance of the distinct group corresponds to an average group dynamic factor performance of the distinct group over the one or more time periods.

As shown in FIG. 7, the respective data point is represented by a circle. In some embodiments, the size of the circle corresponds to an absolute value of an alpha-beta performance of the distinct group. In some embodiments, the color of the circle corresponds to a value of the alpha-beta performance (which may be positive or negative). In some embodiments, the alpha-beta performance corresponds to an average of sums of historical group residual performances and historical group dynamic factor performances for respective time periods of the one or more time periods.

In some embodiments, the chart shown in FIG. 7 may be used to compare member selection, factor timing, and aggregate active management performances across a group of groups or agents. In addition, the chart may be used to obtain a quick visual comparison of group or agents' relative performance. In some cases, the chart may be used to identify groups with the highest/lowest alpha/beta performances.

Alternatively, in some embodiments, the x-axis value may correspond to an alpha score of the distinct group, and the y-axis value may correspond to a beta score of the distinct group. In some embodiments, the size of the circle corresponds to an absolute value of an alpha-beta score of the distinct group and the color of the circle corresponds to a value of the alpha-beta score. Such a chart would be similar to the chart shown in FIG. 7, but it focuses on reliability of performances and confidence in the level of skills, rather than the value of performances.

In some embodiments, the alpha score of the distinct group corresponds to a confidence level of group residual performances of the distinct group over multiple time periods. In some embodiments, the beta score of the distinct group corresponds to a confidence level of group dynamic factor performances of the distinct group over the multiple time periods. In some embodiments, the alpha-beta score corresponds to a confidence level for sums of historical group residual performances and historical group dynamic factor performances for respective time periods of the multiple time periods.

In some embodiments, a computer system detected a user input at a location that corresponds to a particular data point. In response to detecting the user input, the computer system displays additional information about a corresponding group. In some embodiments, the additional information includes time series of one or more of alpha, beta, and alpha-beta performances. In some embodiments, the additional information includes a chart illustrating distributions of one or more of these performance series. In some embodiments, the additional information includes graphs of one or more of these performance series over history. In some embodiments, multiple groups are concurrently selected (e.g., by concurrent or sequential user inputs). In response to detecting that multiple groups are selected, a computer system concurrently displays two or more of the above mentioned additional information or overlay the additional information for two or more groups.

Figure 8:
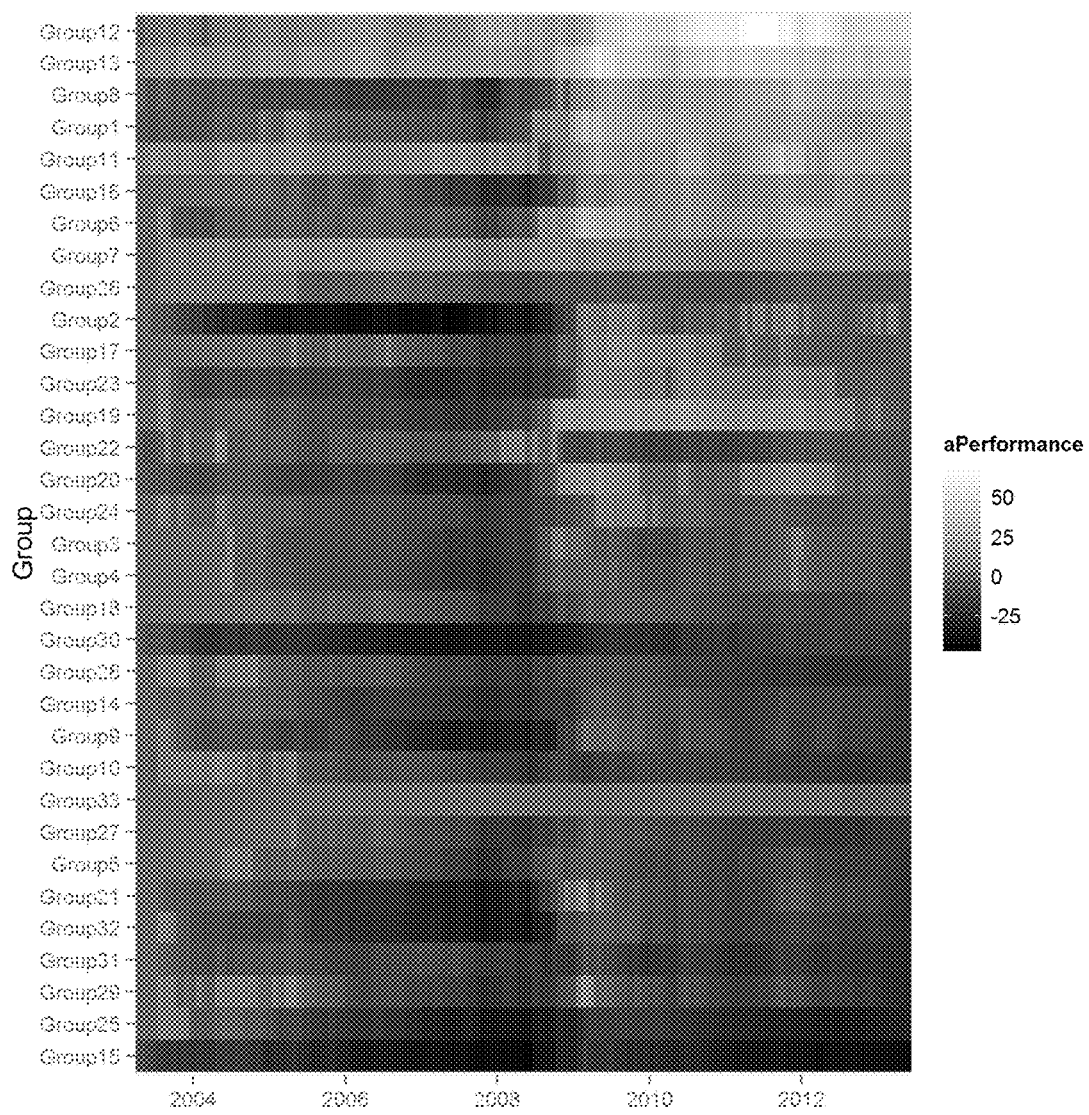
FIG. 8 is a heat map that illustrates a selected performance indicator of groups in accordance with some embodiments.

FIG. 8 is a heat map that illustrates a selected performance indicator of groups in accordance with some embodiments.

The chart shown in FIG. 8 illustrates a two-dimensional matrix of cells. One of a column of cells or a row of cells corresponds to a respective time period and the other of the column of cells and the row of cells corresponds to a distinct group. For example, in FIG. 8, a horizontal strip of cells corresponds to a time series of group residual performances for a respective group.

In some embodiments, a color of a respective cell of the cells corresponds to one of: the respective entry in the historical group dynamic factor performance data, the respective entry in the historical group residual performance data, a value that represents historical group dynamic factor performance data for a predefined set of periods, a value that represents cumulative historical group residual performance data for a predefined set of periods, and a respective combined value corresponding to a sum of one or more respective values in the historical group dynamic factor performance data and one or more corresponding values in the historical group residual performance data. In FIG. 8, a color of a respective cell corresponds to a magnitude of the alpha performance during a corresponding time period.

In some embodiments, a computer system detects a user input selecting a row of the cells (e.g., at a location that corresponds to a y-axis, such as a name of a corresponding group). In response to detecting the user input selecting the row of cells, the computer system displays a graph illustrating a time series of performances (e.g., residual performances) for the corresponding group over a plurality of time periods.

In some embodiments, the computer system detects a user input selecting a column of the cells (e.g., at a location that corresponds to an x-axis, such as a year or a time segment). In response to detecting the user input selecting the column of cells, the computer system displays a graph illustrating performances (e.g., residual performances) of a plurality of groups for a corresponding time period.

In some embodiments, the computer system detects a user input selecting a particular cell on the chart, and displays one or more of the additional information for a corresponding group for a corresponding time period.

The chart shown in FIG. 8 illustrates may be used to identify periods over which groups have generated significant positive and negative group residual performances. The chart in FIG. 8 may also be used to determine which historical regimes and events were associated with high volatility, positive, and negative bias to such performances as well as compare these patterns across a group of groups.

Figure 9:
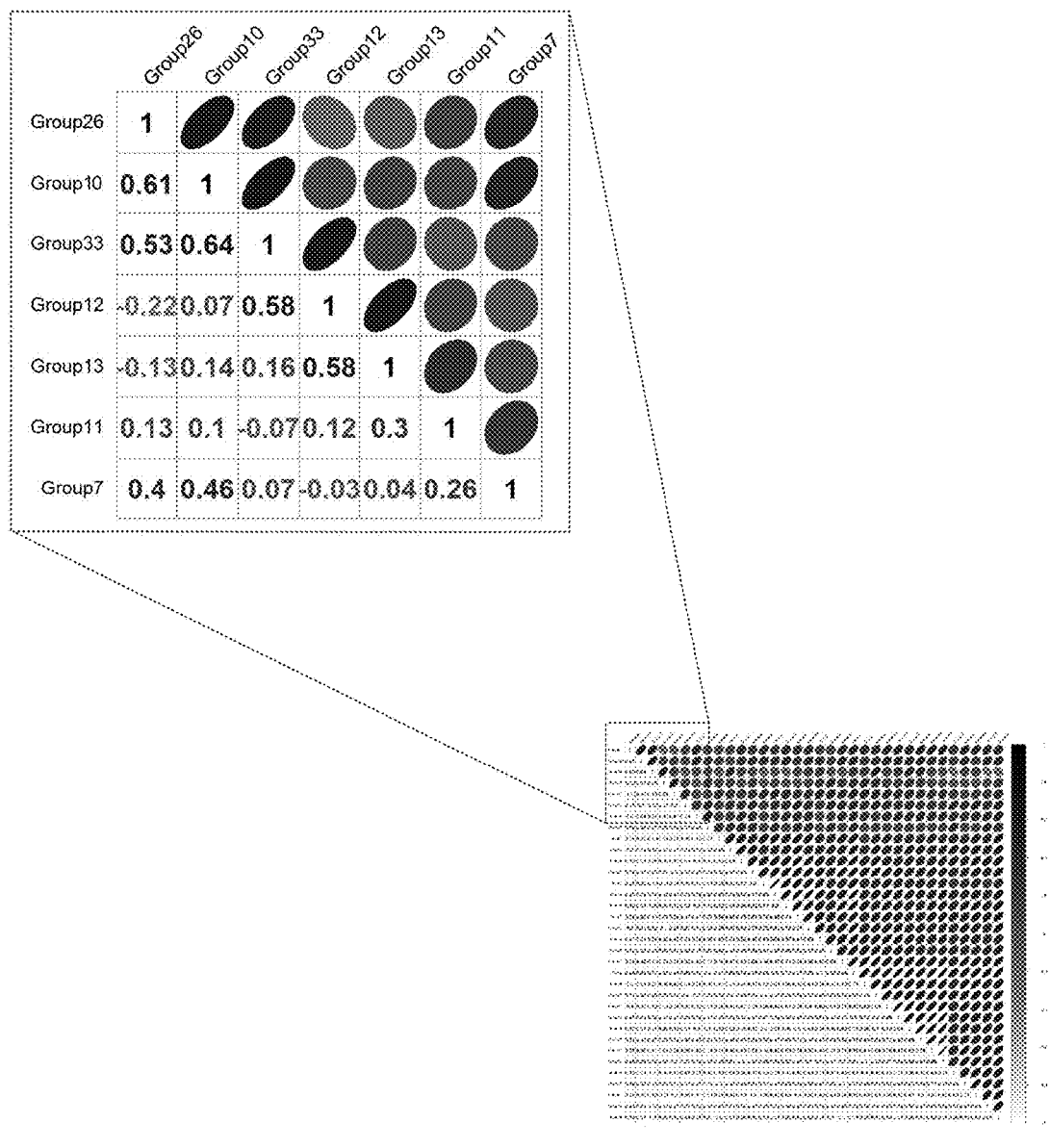
FIG. 9 is a correlation chart that illustrates similarity of groups based on a selected performance indicator in accordance with some embodiments.

FIG. 9 is a correlation chart that illustrates similarity of groups based on a selected performance indicator in accordance with some embodiments.

The correlation chart shown in FIG. 9 illustrates a two-dimensional matrix that graphically represents correlation of performances of a plurality of groups.

In some embodiments, the correlation is determined based on one or more of: the historical group dynamic factor performance data for respective groups and the historical group residual performance data for the respective groups. The chart in FIG. 9 is determined based on historical group residual performances (i.e., alpha performances) of multiple groups.

In FIG. 9, a respective ellipse represents a correlation value between two groups. For example, an ellipse located at a second row from the top and a first column from the left represents a correlation value between a first group named Group10 and a second group named Group26. In some embodiments, an ellipticity of the ellipse represents an absolute value of the correlation value. In some embodiments, an orientation of the ellipse represents whether the correlation value is positive or negative. In some embodiments, a color of the ellipse represents a value of the correlation value. In some embodiments, the respective ellipse is a circle (e.g., when the correlation is zero).

In some embodiments, a first portion of the two-dimensional matrix includes a plurality of ellipses and a second portion of the two-dimensional matrix that does not overlap with the first portion of the two-dimensional matrix includes the plurality of numerical values. The plurality of ellipses graphically represents the plurality of numerical values. Each ellipse corresponds to a respective numerical value of the plurality of numerical values.

In some embodiments, a computer system detects a user input at a location that corresponds to a respective ellipse. In response to detecting the user input at a location that corresponds to the respective ellipse, the computer system displays a scatter plot (for historical group dynamic factor performances for respective groups or historical group residual performances for the respective groups).

In some embodiments, the chart shown in FIG. 9 may be used to identify similarity of member selection strategies between any two groups over a certain time period (e.g., an entire history that corresponds to available data or a portion thereof). The chart may be also used to identify similarity of member selection strategies between a group and a group of groups for a certain time period. In some cases, the chart may be used to identify groups or agents that are undifferentiated (i.e., that have similar member selection strategies) to each other or between a group and the group of groups. In other cases, the chart may be used to identify groups and agents that are differentiated (i.e., that have different member selection strategies).

Figure 10:
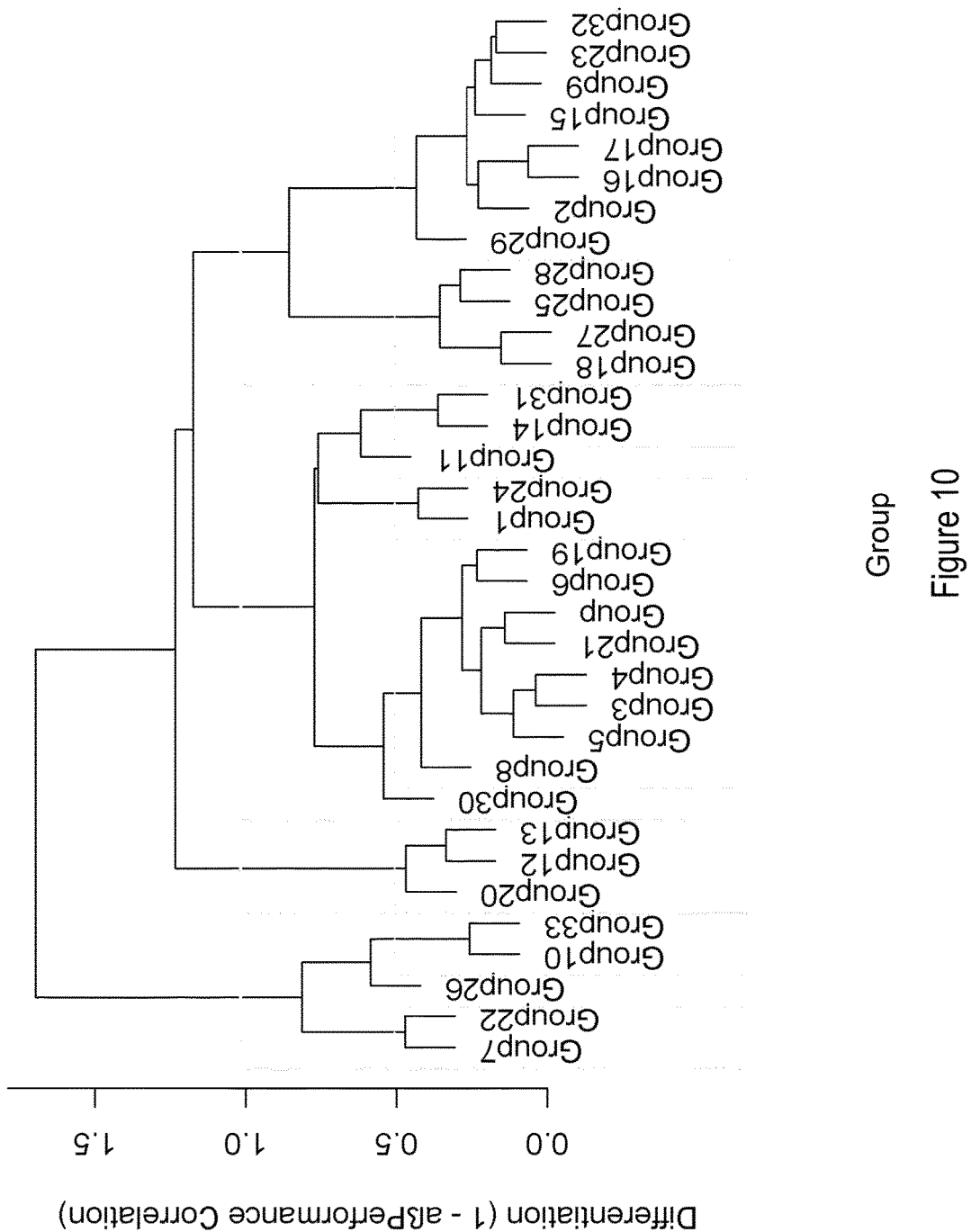
FIG. 10 is a dendogram that illustrates clustering of groups based on a selected performance indicator in accordance with some embodiments.

FIG. 10 is a dendogram that illustrates clustering of groups based on a selected performance indicator in accordance with some embodiments.

The dendrogram shown in FIG. 10 graphically illustrates clustering of performances of the plurality of groups. In FIG. 10, groups are grouped into a tree structure in which each group is combined with another group with a closest correlation.

In some embodiments, the clustering is determined based on one or more of: the historical group dynamic factor performance data for respective groups and the historical group residual performance data for the respective groups. For example, the dendogram shown in FIG. 10 is determined based on the historical group residual performance data (i.e., alpha performances).

In some embodiments, a computer system detects a user input at a location that corresponds to a node (or fork). In response to detecting the user input at the location that corresponds to the node (or fork), the computer system displays a correlation scatter plot for a selected performance indicator for a first group and a second group, wherein the second group is a most closely correlated group to the first group with respect to the selected performance indicator (i.e., alpha performance). In some embodiments, the computer system also displays a graph (e.g., a scatter plot) or table that illustrates historical correlation between the first group and the second group with respect to the selected performance indicator.

In some embodiments, the dendogram is used to identify correlation between any two groups. For example, the dendogram may be used to identify groups of groups with similar member selection strategies. Alternatively, or additionally, the dendogram may be used to identify groups of groups with similar factor timing strategies. In addition, the dendogram may be used to identify groups of groups that have differentiated member selection strategies. In some cases, the dendogram may be used to identify groups that provide the most differentiation or diversification for a plurality of groups. In some other cases, the dendogram may be used to identify groups or agents that pursue least or most unique member selection strategies within a group of groups or agents.

In some embodiments, a user selection of a particular group (e.g., with a touch input on a touch-sensitive display or a mouse click) on one of the charts illustrated in FIGS. 7-10 initiates a display of a chart for a selected performance indicator. For example, in some embodiments, in response to selecting a row for a particular group from a chart shown in FIG. 8, a time series chart or a distribution chart for a selected performance indicator is displayed. In some embodiments, a chart for a selected performance indicator is displayed in response to a user selection user of a particular user interface element.

Figure 11:
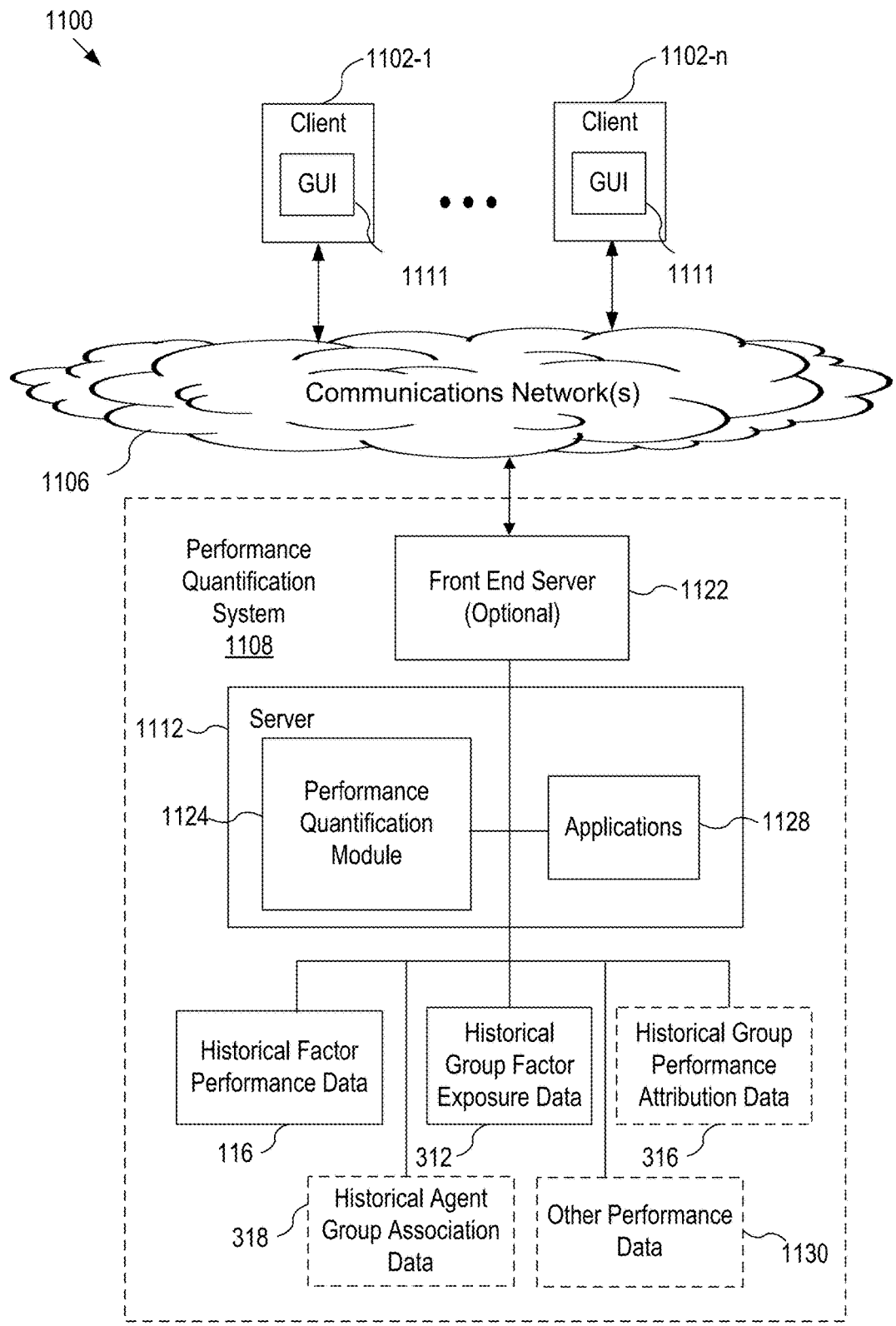
FIG. 11 is a block diagram illustrating an exemplary distributed computer system in accordance with some embodiments.

FIG. 11 is a block diagram illustrating exemplary distributed computer system 1100 in accordance with some embodiments. In FIG. 11, system 1100 includes one or more client computers 1102, communications network 1106, and performance quantification system 1108. Various embodiments of performance quantification system 108 implement the performance quantification methods described in this document.

Client computers 1102 can be any of a number of computing devices (e.g., Internet kiosk, personal digital assistant, cell phone, gaming device, desktop computer, laptop computer, handheld computer, smart phones, or combinations thereof) used to enable the activities described below. Client computer(s) 1102 is also referred to herein as client(s). Client 1102 includes a graphical user interface (GUI) 1111. Client 1102 is connected to performance quantification system 1108 via communications network 1106. As described in more detail below, GUI 1111 is used to display group performance information. Performance quantification system 1108 provides performance quantification services to a community of users (e.g., users of performance quantification system 1108) who access performance quantification system 1108 from clients 1102.

Performance quantification system 1108 includes one or more servers, such as server 1112, connected to communications network 1106. Optionally, the one or more servers are connected to communications network 1106 via front end server 1122 (e.g., a server that conveys (and optionally parses) inbound requests to the appropriate server of system 1108, and that formats responses and/or other information being sent to clients in response to requests). Front end server 1122, if present, may be a web server providing web based access to performance quantification system 1108. Front end server 1122, if present, may also route communications to and from other destinations, such as remote (third party) databases.

Performance quantification system 1108 includes historical factor performance database 116 and historical group factor exposure database 312. In some embodiments, performance quantification system 1108 also includes or has access to one or more other databases, such as historical group performance attribution data 316, historical agent group association database 318 and database 1130 that stores other performance data. Server 1112 includes performance quantification module 1124 and applications 128. Server 1112 communicates with databases internal to historical factor performance database 116, historical group factor exposure database 120, and historical group performance database 120, and in some embodiments, historical agent group association database 318 and database 1130 using a local area network, by internal communication busses, or by any other appropriate mechanism or combination of mechanism.

Server 1112 communicates with clients 1102 via the front end server 1122 (if present) and communication network(s) 1106. In some embodiments, communications network 1106 is the Internet. In other embodiments, communication network 1106 can be any local area network (LAN), wide area network (WAN), metropolitan area network, or a combination of such networks. In some embodiments, server 1112 is a Web server that manages performance quantification requests using appropriate communication protocols. Alternatively, if server 1112 is used within an intranet, it may be an intranet server.

Applications 1128 include application programs used for managing a performance quantification system. In some embodiments, applications 1128 also include a user information processing module, where the user information processing module assists in accessing and updating a user information database (not shown). The user information database stores various information associated with the users of performance quantification system 1108, including user preferences, groups, and optionally other information such as customized reports.

Performance quantification module 1124 retrieves and updates data stored in historical factor performance database 116 and historical group factor exposure database 312. Optionally, performance quantification module 1124 also retrieves and updates data stored in historical group performance attribution database 316, historical agent group association database 318 and/or other performance database 1130.

Historical factor performance database 116 typically stores information concerning historical performances of various types of factors. For example, historical factor performance database 116 may include information identifying that factor A had a performance of 8% in 1998 and 3% in 1999, and factor B had a performance of 20% in 1998 and 15% in 1999.

Historical group factor exposure database 312 typically stores information concerning historical factor exposure data for one or more groups. For example, historical group factor exposure database 312 may include information identifying that group A had 27% exposure to factor A, 52% exposure to factor B, and 21% exposure to factor C in 1998 and group B had 72% exposure to factor A, 13% exposure to factor B, and 15% exposure to factor C in 1998.

Historical group performance attribution database 316 typically includes information concerning historical performance attribution data for one or more groups. For example, historical group performance attribution database 316 may include information identifying that group A had a performance of 13% in 1998 and 3% in 1999, and group B had a performance of 20% in 1998 and 15% in 1999, all due to predefined factors. In some embodiments, historical group performance attribution database 316 includes all the information for performances due to predefined factors as well as residual performances due to individual group members.

Historical agent group association database 318 typically includes information concerning historical group association data for one or more agents. For example, historical agent group association database 318 may include information identifying that agent A is associated with group A from 1990 through 2000, group B from 2000 through 2010, and group C from 2005 through 2013.

In essence, server 1112 is configured to manage certain aspects of performance quantification system 1108, including transmitting quantitative performance data to a respective client 1102.

In some embodiments, fewer and/or additional modules, functions or databases are included in performance quantification system 1108 and server 1112. The modules shown in performance quantification system 1108 and server 1112 represent functions performed in certain embodiments.

Figure 12:
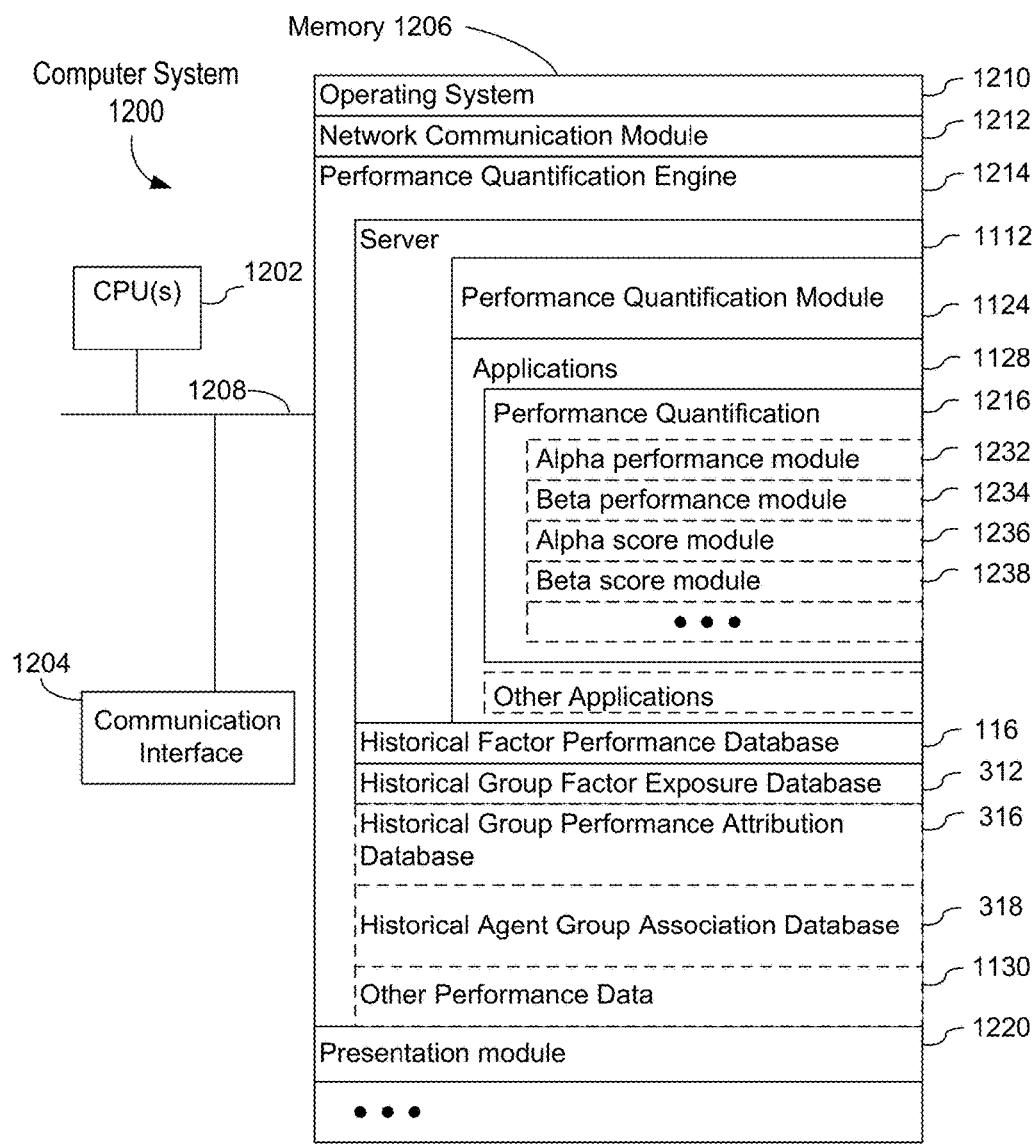
FIG. 12 is a block diagram illustrating a computer system in accordance with some embodiments.
Figure 13A:
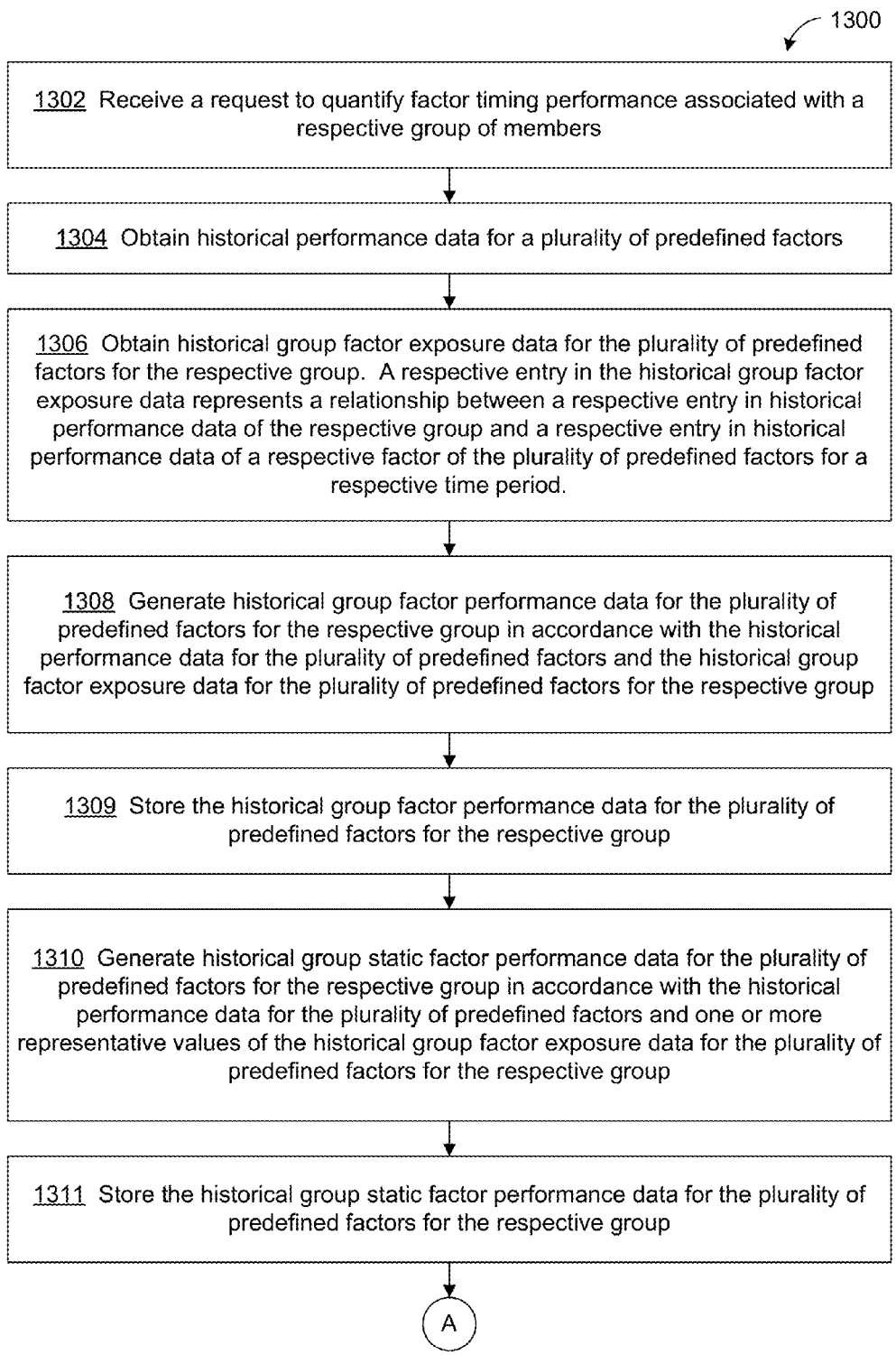
Figure 13B:
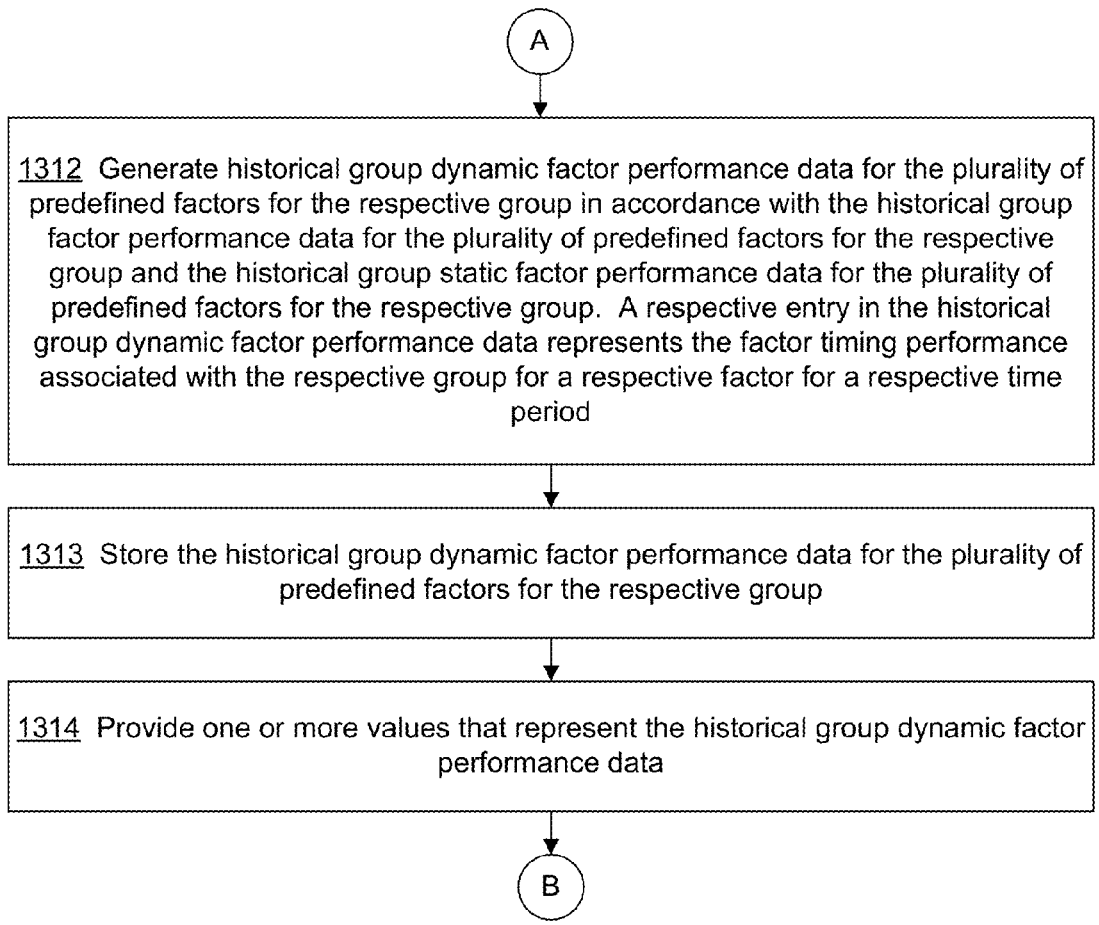

FIG. 12 is a block diagram illustrating computer system 1200 (e.g., performance quantification system 1108) in accordance with some embodiments. Computer system 1200 typically includes one or more processing units (CPUs) 1202, one or more network or other communications interfaces 1204, memory 1206, and one or more communication buses 1208 for interconnecting these components. In some embodiments, communication buses 1208 include circuitry (sometimes called a chipset) that interconnects and controls communications between system components. In some embodiments, computer system 1200 includes a user interface (not shown) (e.g., a user interface having a display device, a touch screen, a touch pad, a keyboard, and a mouse or other pointing device). In some other embodiments (e.g., when computer system 1200 is implemented as a server), computer system 1200 is controlled from and accessed by various client systems.

Memory 1206 of computer system 1200 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1206 may optionally include one or more storage devices remotely located from the CPU(s) 1202. Memory 1206, or alternately the non-volatile memory device(s) within memory 1206, comprises a non-transitory computer readable storage medium. In some embodiments, memory 1206 or the computer readable storage medium of memory 1206 stores the following programs, modules and data structures, or a subset thereof:

- Operating System 1210 that includes procedures for handling various basic system services and for performing hardware dependent tasks;
- Network Communication Module (or instructions) 1212 that is used for connecting computer system 1200 to other computers (e.g., clients 1102) via one or more communications interfaces 1204 and one or more communications networks 1106 (FIG. 11), such as the Internet, other wide area networks, local area networks, metropolitan area networks, and so on;
- Performance Quantification Engine 1214 that receives performance quantification requests from and provides responses to clients 1102; and
- Presentation module 1220 that formats results from Performance Quantification Engine 1214 for display at respective clients; for example, presentation module 1220 may generate a web page or XML document that includes performance information; in some embodiments presentation module 1220 is executed by front end server 1122 (FIG. 11), which comprises one of the servers implementing performance quantification system; optionally presentation module 1220 is a module of performance quantification engine 1214.

In some embodiments, Performance Quantification Engine 1214 includes the following programs, modules and data structures, or a subset or superset thereof:

- server 1112 for managing certain aspects of computer system 1200 including performance quantification module 1124, and applications 1128, including performance quantification application 1216 for performing the primary functions of a performance quantification system; performance quantification application 1216 includes one or more of alpha performance module 1232, beta performance module 1234, alpha score module 1236, and beta score module 1238, and may optionally include other modules;
- Historical Factor Performance Database 116;
- Historical Group Factor Performance Database 312;
- (Optional) Historical Group Performance Attribution Database 316;
- (Optional) Historical Agent Group Association Database 318; and
- (Optional) Other Performance Data 1130.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 1206 may store a subset of the modules and data structures identified above. Furthermore, memory 1206 may store additional modules and data structures not described above.

Notwithstanding the discrete blocks in FIGS. 11 and 12, these figures are intended to be a functional description of some embodiments rather than a structural description of functional elements in the embodiments. One of ordinary skill in the art will recognize that an actual implementation might have the functional elements grouped or split among various components. In practice, and as recognized by those of ordinary skill in the art, items shown separately could be combined and some items could be separated. For example, in some embodiments, historical factor performance database 116 is part of or stored within server 112. In other embodiments, historical factor performance database 116 is implemented using one or more servers whose primary function is to store and process user information. In some embodiments, historical group factor exposure database 312 includes historical factor performance database 116, or vice versa. Similarly, other performance database 1130 can be implemented on one or more servers.

The actual number of servers used to implement performance quantification system 1108 and how features are allocated among them will vary from one implementation to another, and may depend in part on the amount of data traffic that the system must handle during peak usage periods as well as during average usage periods, and may also depend on the amount of data stored by the performance quantification system. Moreover, one or more of the blocks in FIG. 11 may be implemented on one or more servers designed to provide the described functionality. Although the description herein refers to certain features implemented in client 1102 and certain features implemented in server 1112, the embodiments are not limited to such distinctions. For example, features described herein as being part of server 1112 can be implemented in whole or in part in client 1102, and vice versa.

FIGS. 13A-13G are flowcharts representing method 1300 of quantifying performance of a group in accordance with some embodiments. In some embodiments, method 1300 is performed by a computer system (e.g., computer system 1200 in FIG. 12).

In some embodiments, the computer system receives (1302) a request to quantify factor timing performance associated with a respective group. In some embodiments, computer system 1200 (FIG. 12) receives a request from client 1102 (FIG. 11). In some embodiments, computer system 1200 receives a request from a user accessing computer system 1200. In some embodiments, computer system 1200 that receives the request is a client. In some embodiments, the request comprises a request to quantify factor timing performance associated with the respective group over a specific set of dates.

The computer system obtains (1304) historical performance data for a plurality of predefined factors. In some embodiments, the computer system retrieves the historical performance data for the plurality of predefined factors from historical factor performance database 116 (FIG. 12). For example, the computer system obtains historical performance (e.g., failure rates) of various classes of machines in a factory (e.g., milling machine, lathe, welding machine, etc.). In some embodiments, the computer system receives the historical performance data for the plurality of predefined factors from another system or module (e.g., factor performance estimator 114, FIG. 1). In some embodiments, the computer system receives the historical performance data for the plurality of predefined factors from a third party server. The historical performance data for the plurality of predefined factors includes performance data for the plurality of predefined factors for a plurality of respective time periods. For example, the historical performance data for the plurality of predefined factors includes a performance of a first factor for a first time period, a performance of the first factor for a second time period, a performance of the first factor for a third time period, a performance of a second factor for the first time period, a performance of the second factor for the second time period, and a performance of the second factor for the third time period. A person having ordinary skill in the art would understand that the number of predefined factors (e.g., the first factor, the second factor, etc.) and the number of time periods (e.g., the first time period, the second time period, the third time period, etc.) may vary.

The computer system obtains (1306) historical group factor exposure data for the plurality of predefined factors for the respective group. A respective entry in the historical group factor exposure data represents a relationship between a respective entry in historical performance data of the respective group and a respective entry in historical performance data of a respective factor of the plurality of predefined factors for a respective time period. In some embodiments, the historical group factor exposure data indicates what fraction of the machines at the factory is represented by each class of machines (e.g., 20% of the machines at the factory are milling machines). Typically, the historical group performance data for the respective group includes performances of the respective group over a plurality of respective time periods. For example, the historical group performance data for the respective group includes a performance of the respective group for a first time period, a performance of the respective group for a second time period, a performance of the respective group for a third time period, etc. Typically, the historical performance data of the respective factor includes performances of the respective factor over the plurality of respective time periods. For example, the historical performance data of the respective factor includes a performance of the respective factor for the first time period, a performance of the respective factor for the second time period, a performance of the respective factor for the third time period, etc. In some embodiments, the computer system retrieves the historical group factor exposure data from historical group factor exposure database 312 (FIG. 12). In some embodiments, the computer system retrieves the historical group factor exposure data from another system or module (e.g., group factor exposure estimator 310, FIG. 3). In some embodiments, the computer system retrieves the historical group factor exposure data from a third party server. In some embodiments, the computer system obtains the historical group performance data of the respective group from one or more of data sources shown in FIG. 2. In some embodiments, the computer system determines the historical group performance of the respective group for a respective time period based on weights of members, that constitute the respective group, in the respective group and performances of the members. In some embodiments, the historical group factor exposure data is determined in accordance with historical performance data of respective members in the respective group, historical performance data of the plurality of predefined factors, and weights of the respective members in the respective group.

In some embodiments, a historical member factor exposure for the respective factor and the respective member of the respective group corresponds to a regression coefficient for a regression between the historical member performance data of the respective member of the respective group and the historical performance data of the respective factor. In some embodiments, the respective group corresponds to a weighted sum of the plurality of members, and a historical group factor exposure for the respective factor and the respective group corresponds to a sum of the exposures to the respective factor for the respective members weighted by the group weight of the respective members.

The computer system generates (1308) historical group factor performance data for the plurality of predefined factors for the respective group in accordance with the historical performance data for the plurality of predefined factors and the historical group factor exposure data for the plurality of predefined factors for the respective group. In some embodiments, a group factor performance for a respective factor for the respective group for a respective time period corresponds to a performance of the respective factor for the respective time period multiplied by a historical group factor exposure for the respective factor for the respective group for the respective time period. For example, a group factor performance for milling machines represents what fraction of the overall failure rate for the factory is due to the milling machines in the factory.

The computer system stores (1309) the historical group factor performance data for the plurality of predefined factors for the respective group.

The computer system generates (1310) historical group static factor performance data for the plurality of predefined factors for the respective group in accordance with the historical performance data for the plurality of predefined factors and one or more representative values of the historical group factor exposure data for the plurality of predefined factors for the respective group. In some embodiments, the one or more representative values of the historical group factor exposure data correspond to one or more average values of respective subsets of values in the historical group factor exposure data. In some embodiments, the one or more representative values of the historical group factor exposure data for a respective factor for the respective group includes an average of factor exposure values for the respective factor for the respective group over a plurality of time periods. In some embodiments, a group static factor performance for the respective factor for the respective group for a respective time period corresponds to a performance of the respective factor for the respective time period multiplied by the average of factor exposure values for the respective for the respective group over the plurality of time periods.

The computer system stores (1311) the historical group static factor performance data for the plurality of predefined factors for the respective group.

The computer system generates (1312, FIG. 13B) historical group dynamic factor performance data for the plurality of predefined factors for the respective group in accordance with the historical group factor performance data for the plurality of predefined factors for the respective group and the historical group static factor performance data for the plurality of predefined factors for the respective group. A respective entry in the historical group dynamic factor performance data represents the factor timing performance associated with the respective group for a respective factor for a respective time period. In some embodiments, a group dynamic factor performance for a respective factor for a respective time period corresponds to a difference between a group factor performance for the respective factor for the respective time period and a historical group static factor performance for the respective factor for the respective time period.

The computer system stores (1313) the historical group dynamic factor performance data for the plurality of predefined factors for the respective group.

The computer system provides (1314) one or more values that represent the historical group dynamic factor performance data. In some embodiments, the one or more values that represent the historical group dynamic factor performance data include an average of values in the historical group dynamic factor performance data for one or more predefined factors. In some embodiments, the computer system determines and provides an average of group dynamic factor performances for a respective factor over a plurality of time periods. In some embodiments, the computer system determines and provides an average of group dynamic factor performances for a plurality of factors for a respective time period. In some embodiments, the computer system determines and provides an average of group dynamic factor performances for a plurality of factors over a plurality of time periods. In some embodiments, providing the one or more values that represent the historical group dynamic factor performance data includes graphically displaying the one or more values that represent the historical group dynamic factor performance data (e.g., using one or more charts shown in FIGS. 7-10).

In some embodiments, the computer system, subsequent to generating the historical group dynamic factor performance data, determines (1316, FIG. 13C) one or more values that indicate reliability (e.g., confidence level) of the historical group dynamic factor performance data; and provides the one or more values that indicate reliability of the historical group dynamic factor performance data. In some embodiments, the one or more values that indicate the reliability of the historical group dynamic factor performance data includes a confidence level for a statistical test comparing an average historical group dynamic factor performance to 0.

In some embodiments, the computer system generates (1318) historical group residual performance data for the respective group in accordance with the historical group performance data for the respective group and the historical group factor performance data for the plurality of predefined factors for the respective group. A respective entry in the historical group residual performance data represents member selection performance associated with the respective group. The computer system provides one or more values that represent the historical group residual performance data. In some embodiments, the one or more values that represent the historical group residual performance data include an average of values in the historical group residual performance data. Typically, the member selection performance associated with the respective group is not correlated with historical performance data for any one of the plurality of predefined factors.

In some embodiments, the computer system determines (1320) one or more values that indicate reliability (e.g., confidence level) of the historical group residual performance data; and provides one or more values that indicate reliability of the historical group residual performance data. In some embodiments, the one or more values that indicate the reliability of the historical group residual performance data includes a confidence level for a statistical test comparing an average historical group residual performance to 0.

In some embodiments, the computer system determines (1322) one or more combined values from the historical group dynamic factor performance data and the historical group residual performance data, a respective combined value, of the one or more combined values, corresponding to a sum of one or more respective values in the historical group dynamic factor performance data and one or more corresponding values in the historical group residual performance data; and provides at least a subset of the one or more combined values.

In some embodiments, the computer system identifies (1324) a plurality of groups associated with a respective agent. The plurality of groups includes the respective group. The computer system generates historical group dynamic factor performance data for the plurality of predefined factors for particular groups of the plurality of groups; and provides one or more values that represent the historical group dynamic factor performance data for the plurality of predefined factors for the particular groups of the plurality of groups.

In some embodiments, the one or more values that represent the historical group dynamic factor performance data for the plurality of predefined factors for the particular groups of the plurality of groups are provided (1326) in response to a request to quantify factor timing performance of the respective agent.

In some embodiments, the computer system identifies (1328, FIG. 13C) a plurality of groups associated with a respective agent, wherein the plurality of groups includes the respective group. The computer system generates historical group residual performance data for particular groups in the plurality of groups; and provides one or more values that represent the historical group residual performance data for the particular groups of the plurality of groups.

In some embodiments, the one or more values that represent the historical group residual performance data for the particular groups of the plurality of groups are provided (1330) in response to a request to quantify member selection performance of the respective agent.

In some embodiments, a first group of the plurality of groups spans (1332) over a first time period and a second group of the plurality of groups spans over a second time period distinct from the first time period. For example, start dates and/or end dates of the first group and the second group may differ.

In some embodiments, the computer system identifies (1334) a respective range based on the historical group factor exposure data for a respective factor. In some embodiments, the respective range includes one or more of: a maximum, minimum, average, median, standard deviation of the historical group factor exposure data for a respective factor. The computer system determines whether a current group factor exposure for the respective factor is outside of the respective range for the respective factor; and, in accordance with a determination that the current group factor exposure for the respective factor is outside of the respective range for the respective factor, provides a notification indicating that the current group factor exposure for the respective factor is outside the respective range for the respective factor. In some embodiments, the notification is provided to a client device. Typically, that the current group factor exposure for the respective factor is outside the respective range for the respective factor indicates a style drift (of a group or its agent). In some embodiments, the method includes concurrently displaying the respective range and the current group exposure for multiple factors.

In some embodiments, the historical group dynamic factor performance data for a first factor represents a factor timing performance associated with the respective group for the first factor.

In some embodiments, the computer system displays (1336) a graph representing entries in the historical group factor exposure data for a second factor and entries in the historical performance data of the second factor, wherein the graph includes a plurality of data points, a respective data point having a first axis value that corresponds to a respective entry in the historical group factor exposure data for the second factor and a second axis value that corresponds to a corresponding entry in the historical performance data of the second factor.

In some embodiments, the computer system generates (1338) historical group residual performance data for a subset of the respective group in accordance with historical group performance data for the subset of the respective group and the historical group factor performance data for the subset of the respective group. A respective entry in the historical group residual performance data represents residual member selection performance associated with the subset of the respective group. In some embodiments, the respective group is divided based on one or more selection criteria. For example, the subset may include members belonging to a particular sector, geographic location, type (electric-powered vs. gas-powered), or any other differentiating criteria. In some embodiments, the historical group residual performance data for the subset of the respective group represents a member selection performance associated with the respective group for some sectors or geographic locations (but not others). The historical group residual performance data for the subset of the respective group may be used to identify an agent with a reliable skill in selecting members in a specific country or sector.

In some embodiments, the computer system generates (1340, FIG. 13D) historical group residual performance data for a first group. The first group includes members in the respective group and the members in the first group have same weights as each other. The computer system provides one or more values that represent the historical group residual performance data for the first group.

In some embodiments, the method includes determining one or more values that indicate reliability of the historical group residual performance data for the first group; and providing one or more values that indicate reliability of the historical group residual performance data for the first group.

In some embodiments, the method includes determining a difference between a first value that represents the historical group residual performance data for the respective group and a second value that represents the historical group residual performance data for the first group.

In some embodiments, the computer system generates (1341-1) historical group residual performance data for a subset of the respective group in accordance with historical group performance data for the subset of the respective group and the historical group factor performance data for the subset of the respective group. A respective entry in the historical group residual performance data represents residual member selection performance associated with the subset of the respective group. In some embodiments, the computer system generates historical group residual performance data for a first group. The computer system generates expected residual performance data for the subset of the respective group in accordance with one or more of the historical group residual performance data for the respective group, the historical group residual performance data for the subset of the respective group, a difference of the historical group residual performance data for the subset of the respective group and historical group residual performance data for a first group, and current group factor exposure data for the subset of the respective group. The first group includes members in the respective group and the members in the first group have same weights as each other. The computer system stores the expected residual performance data for the subset of the respective group. In some embodiments, a historical expected residual performance for a subset of the respective group is a weighted sum of a historical group residual performance for the respective group, a historical group residual performance for the subset of the respective group, a difference between the historical group residual performance data for the subset of the respective group and the historical group residual performance for the first group, a current group factor exposure for the subset of the respective group, and a multiple of the difference between the historical group residual performance data for the subset of the respective group and the historical group residual performance for the first group and a current group factor exposure for the subset of the respective group.

In some embodiments, the computer system repeats (1341-2) generating expected residual performance data for distinct subsets of the respective group. The computer system generates expected residual performance data for the respective group in accordance with the expected residual performance data for the distinct subsets of the respective group. The computer system stores the expected residual performance data for the respective group. In some embodiments, an expected residual performance for the respective group is a weighted sum of a historical group residual performance for the respective group, historical group residual performance for the subsets of the respective group, differences between the historical group residual performance data for the distinct subsets of the respective group and the historical group residual performance for corresponding first groups, and current group factor exposure for the subsets of the respective group.

In some embodiments, the historical group factor exposure data is determined (1342, FIG. 13F) in accordance with historical member factor exposure data and historical group member exposure data. In some embodiments, the computer system determines the historical group factor exposure data in accordance with the historical member factor exposure data and the historical group member exposure data (e.g., as weighted sums of historical member factor exposures, weighted by historical group member exposures).

In some embodiments, the computer system displays (1344) a first chart selected from a set of charts (e.g., a user interface illustrated in FIG. 6 with region 610 including a chart shown in FIG. 7).

In some embodiments, the set of charts includes a first chart that includes a plurality of first data points (e.g., FIG. 7). A respective first data point corresponds to a distinct group or a set of groups. The respective first data point has a first axis value that represents one of: the historical group dynamic factor performance data for the distinct group or the set of groups and a value that indicates reliability of the historical group dynamic factor performance data. The respective first data point has a second axis value that represents one of: the historical group residual performance data for the distinct group or the set of groups and a value that indicates reliability of the historical group residual performance data.

In some embodiments, the set of charts includes a second chart that illustrates a two-dimensional matrix of cells (e.g., FIG. 8). One of a column of cells or a row of cells corresponds to a respective time period and the other of the column of cells and the row of cells corresponds to a distinct group or a set of groups. A respective cell of the cells corresponds to one of: the respective entry in the historical group dynamic factor performance data, the respective entry in the historical group residual performance data, a value that represents cumulative historical group dynamic factor performance data for a predefined set of periods, a value that represents cumulative historical group residual performance data for a predefined set of periods, and a respective combined value corresponding to a sum of one or more respective values in the historical group dynamic factor performance data and one or more corresponding values in the historical group residual performance data.

In some embodiments, the set of charts includes a correlation chart that illustrates a two-dimensional matrix that graphically represents correlation of performances of a plurality of groups (e.g., FIG. 9). The correlation is determined based on one or more of: the historical group dynamic factor performance data for respective groups and the historical group residual performance data for the respective groups.

In some embodiments, the set of charts includes a dendrogram that graphically illustrates clustering of performances of the plurality of groups (e.g., FIG. 10). The clustering is determined based on one or more of: the historical group dynamic factor performance data for respective groups and the historical group residual performance data for the respective groups.

In some embodiments, the computer system concurrently displays one or more user interface elements with the first chart (e.g., user interface elements 602, 604, 606, and 608 in FIG. 6). While displaying the first chart and the one or more user interface elements (e.g., FIG. 6), the computer system detects a selection of one of the one or more user interface elements (e.g., on user interface element 604). In response to detecting the selection of one of the one or more user interface elements, the computer system replaces the display of the first chart with a display of a second chart (e.g., FIG. 7), wherein the second chart is selected from the set of charts and the second chart is distinct from the first chart.

In some embodiments, the computer system generates (1346) expected dynamic factor performance data for a respective factor in accordance with the historical group dynamic factor performance data and current group factor exposure data for the respective group for the respective factor. The computer system stores the expected dynamic factor performance data for the respective factor. In some embodiments, an expected dynamic factor performance for the respective factor is a weighted sum of a historical group dynamic factor performance for the respective group and a historical group dynamic factor performance for the respective factor.

In some embodiments, the computer system repeats (1348) generating expected dynamic factor performance data for distinct factors of the respective group. The computer system generates expected dynamic factor performance data for the respective group in accordance with the expected dynamic factor performance data for the distinct factors. The computer system stores the expected aggregate dynamic factor performance data for the respective group. In some embodiments, an expected dynamic factor performance for the respective group is a weighted sum of a historical group dynamic factor performance for the respective group and historical group dynamic factor performance values for the distinct factors.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

For example, in some embodiments, a method for quantifying performance associated with a group includes receiving, at a computer system with one or more processors and memory, a request to quantify member selection performance of a respective group. The method includes obtaining, at the computer system, historical performance data for a plurality of predefined factors; and obtaining, at the computer system, historical group factor exposure data for the plurality of predefined factors for a respective group, wherein the historical group factor exposure data includes information identifying a respective relationship between historical group performance data of the respective group and historical performance data of a respective factor of the plurality of predefined factors. The method also includes generating, at the computer system, historical group factor performance data for the plurality of predefined factors for the respective group in accordance with the historical performance data for the plurality of predefined factors and the historical group factor exposure data for the plurality of predefined factors for the respective group. The method further includes generating, at the computer system, historical group residual performance data for the respective group in accordance with historical group performance data for the respective group and the historical group factor performance data for the plurality of predefined factors for the respective group, wherein a respective entry in the historical group residual performance data represents member selection performance of the respective group; and providing one or more values that represent the historical group residual performance data.

In some embodiments, a method for providing performance data for multiple groups includes displaying a first chart selected from a set of charts.

In some embodiments, the set of charts includes a scatter plot (e.g., FIG. 7) that includes a plurality of first data points, a respective first data point corresponding to a distinct group or a set of groups, the respective first data point having a first axis value that represents one of: historical group dynamic factor performance data for the distinct group or the set of groups and a value that indicates reliability of the historical group dynamic factor performance data and a second axis value that represents one of: historical group residual performance data for the distinct group or the set of groups and a value that indicates reliability of the historical group residual performance data.

In some embodiments, the set of charts includes a heat map (e.g., FIG. 8) that illustrates, for a plurality of groups and a plurality of time periods, one of: a respective entry in the historical group dynamic factor performance data, a respective entry in the historical group residual performance data, a value that represents cumulative historical group dynamic factor performance data for a predefined set of time periods, a value that represents cumulative historical group residual performance data for a predefined set of time periods, and a respective combined value corresponding to a sum of one or more respective values in the historical group dynamic factor performance data and one or more corresponding values in the historical group residual performance data.

In some embodiments, the set of charts includes a correlation chart (e.g., FIG. 9) that graphically represents correlation of performances of a plurality of groups, wherein the correlation is determined based on one or more of: the historical group dynamic factor performance data for respective groups, and the historical group residual performance data for the respective groups.

In some embodiments, the set of charts includes a dendrogram (e.g., FIG. 10) that graphically illustrates clustering of performances of the plurality of groups, wherein the clustering is determined based on one or more of: the historical group dynamic factor performance data for respective groups, and the historical group residual performance data for the respective groups.

The method includes concurrently displaying one or more user interface elements with the first chart; while displaying the first chart and the one or more user interface elements, detecting a selection of one of the one or more user interface elements; and, in response to detecting the selection of the one of the one or more user interface elements, replacing the display of the first chart with a display of a second chart. The second chart is selected from the set of charts and the second chart is distinct from the first chart.

In some embodiments, the methods and system described herein can be used with other entities, such as mechanical procedures, chemical processes, investment portfolios, and medical procedures, etc.

Definitions

As used herein, the following terms are defined as shown below.

Factor—a variable used to describe variability among observed, correlated variables. In some cases, a factor is an unobserved variable. For example, a factor can be failure rates of a class of machines at a factory, and the factor can be used to describe a failure rate of all machines at the factory.

Factor analysis—a statistical method used to describe variability among observed, correlated variables in terms of a potentially lower number of factors.

Factor model (also called herein member performance factor model)—a model that includes one or more factors to describe a performance of members and groups.

Group—a collection of members (e.g., machines, etc.). An exemplary group is a group of machines at a factory. The composition of group may change over time. The composition of group at a particular point in time or during a particular period of time is determined by group member weightings or group member exposures, defined below.

Member performance—the performance of a member S over a time period p. In some cases, the term "member performances" refers to a collection of performances over periods $(p_1, \ldots, p_n)$ in history H. As used herein, history H refers to a set of time periods.

Group performance—a performance of a group P for a time period p. In some cases, the term "group performances" refers to a collection of performances over periods in history H.

Factor performance—a performance of a particular factor F for a time period p or a collection of performances of a particular factor F over periods in history H.

Factor performances—a collection of performances of all factors specified by a particular factor model. The following is an example of a data structure containing factor performances for a particular point in time for the factors defined by an exemplary factor model represented in statistical programming notation:

factor.performances[1/31/2012]=list(Group=1.0576, Milling Machines=−0.8514, Lathes=0.0739, Machine Centers=1.2537, Drills=0.5742, ForkLifts=−0.9453, Trucks=1.2373, Conveyor=0.7618, Sorter=0.9826, Packager=0.0498, Labeler=−0.0163, Size=0.6054, Value=0.7800, Reference=0.0000)

In some cases, factor performances for a collection of periods (p1, . . . , pn) in history H are expressed as a matrix where each row contains factor performances for a time period p in history H:

$$\text{factor.performances}[H] = \text{matrix}\begin{pmatrix} & \text{Factory} & \text{Milling Machines} & \text{Lathes} & \ldots \\ 1/31/2013 & 1.0576 & -0.8514 & 0.0739 & \\ 2/28/2013 & 3.2761 & 2.4519 & 4.0386 & \ldots \end{pmatrix}$$

Member factor exposures—a collection of terms representing the relationship between performances of a member and performances of each factor defined by a factor model. The following is an example of a data structure containing factor exposures of a machine (MachineA) at a particular point in time based on factors defined by an exemplary factor model represented in statistical programming notation:

member.factor.exposures[MachineA, 2/28/2013]=list (Group=0.9178, Milling Machines=0, Lathes=0, Machine Centers=0, Drills=0, ForkLifts=0, Trucks=0, Conveyor=0, Sorter=0, Packager=0.0894, Labeler=0, Size=0.2260, Value=0.0078, Reference=1.0000)

In some cases, member factor exposures can be expressed for a group P of members as a matrix where each row is member factor exposures for a respective member S in the group P for a period p. The following is an example of a data structure containing factor exposures for members in the group P:

$$\text{member.factor.exposures}[P, 2/28/2013] = \text{matrix}\begin{pmatrix} & \text{Factory} & \text{Milling Machines} & \text{Lathes} & \ldots \\ MachineA & 1.0345 & 0 & 0 & \\ MachineB & 1.1398 & 0 & 0 & \ldots \end{pmatrix}$$

In some cases, the member factor exposures can be expressed for a member over a collection of time periods (p1, . . . , pn) in history H as a matrix where each row is member factor exposures for a respective time period p in H. The following is an example of a data structure containing factor exposures for a member FactoryA for time periods in history H:

$$\text{member.factor.exposures}[MachineA, H] = \text{matrix}\begin{pmatrix} & \text{Factory} & \text{Milling Machines} & \text{Lathes} & \ldots \\ 1/31/2013 & 0.9178 & 0 & 0 & \\ 2/28/2013 & 0.9365 & 0 & 0 & \ldots \end{pmatrix}$$

Member performance attribution (also called herein decomposition)—A process of describing a historical performance of a member in terms of independent variables (e.g., factors). In statistical programming notation, factor models define member performance r[S, p] for a member S over a time period p as:

$$r[S, p] = \text{sum}(\text{member.factor.exposures}[S, p] * \text{factor.performances}[p]) + \text{member.residual.performance}[S, p]$$

where member.factor.exposures[S, p] is a vector of terms capturing the relationship between the performances of S and each factor defined by the factor model, factor.performances[p] is a vector of performances over the time period p for each factor defined by the factor model and member.residual.performance[S, p] is the portion of r[S, p] not attributable to the factors.

Compounded performance (also called herein multi-period performance)—a representative performance over a number of consecutive period. For example, a compounded performance for member S over periods (p1, . . . pn) in history H is determined from performances for member S (where a unit of performance is expressed in percents) in accordance with a following statistical programming notation:
  compounded.r[S, H]=
  compounded(r[S, H])=(1+r[S, p1])* . . . *(1+r[S, pn])
In some embodiments, an active management skill is evaluated using compounded performances for predefined performance sources over predefined periods.

Rate of performance (also called herein performance)—a change in a value of a member or a group over a reference time period (e.g., one year). Typically, a performance is expressed as a fraction of a change in a value of a member or a group over a reference time period over the value of the member or the group. In some cases, the performance is expressed as a normalized performance over a standard time period (e.g., one year). In other words, an annualized rate of performance may be used (e.g., when the value of a member changes over 3 months is 1%, its annualized performance of ~4% may be used). In some embodiments, a continuously compounded rate of performance is calculated for each period and annualized.

Group member exposures—a collection of terms representing weights of each member within a group. In some embodiments, a group member exposure corresponds to a ratio between a change in a performance value of a group due to a change in a performance value of a member and the change in the performance value of the member at a corresponding point in time (or a corresponding time period). In some embodiments, a group member exposure corresponds to a derivative of a performance value of a group with respect to a performance value of a respective member. An example of a data structure that represents group member exposures of a group P at a particular point in time is as follows:

group.member.exposures[P, 2/28/2013]=list(MachineA=5.00%, MachineB=10.00%, MachineC=10.00%, . . . )

Group factor exposure—exposure of a group to a particular factor at a specific point in time.
  group.factor.exposure[P, Factory, 2/28/2013]=1.0345

Group factor exposures—a collection of terms representing the relationship between performances of a group and each factor defined by a factor model. In some embodiments, data representing group factor exposures has a same structure as data representing member factor exposures. The following is an example of a data structure containing group factor exposures for a particular point in time based on factors defined by an exemplary factor model represented in statistical programming notation:
  group.factor.exposures[P, 2/28/2013]=list(Factory=1.5863, Milling Machines=0,
    Lathes=-0.3785, Machine Centers=0, Drills=23.7415,
    ForkLifts=0, Trucks=0, Conveyor=0,
    Sorter=0, Packager=0.0894,
    Labeler=0, Size=45.0733, Value=100.8918,
    Reference=1.0000)

In some cases, group factor exposures are determined as member-weighted sums of group member factor exposures (i.e., sums of member factor exposures multiplied by respective group member exposures), or a matrix product of a member factor exposures matrix and a group member exposures vector.

In some cases, group factor exposures for periods (p1, . . . , pn) in history H for a group P based on a set of factors (e.g., F1, F2, . . . ) is expressed in a matrix form as follows:

$$\text{group.factor.exposures}[P, H] = \text{matrix}\begin{pmatrix} & p1 & p2 & \ldots \\ F1 & \text{group.factor.exposure}[P, F1, p1] & \text{group.factor.exposure}[P, F1, p2] & \ldots \\ F2 & \text{group.factor.exposure}[P, F2, p1] & \text{group.factor.exposure}[P, F2, p2] & \ldots \end{pmatrix}$$

Member factor performance—a performance of member S for a time period p contributed by factors. In some cases, the member factor performance is determined based on factor exposures of S and factor performances over p. In statistical programming notation, this can be expressed as follows:
  member.factor.performance[S, p]=sum(member.factor.exposures[S, p]*factor.performances[p])

Member residual performance (also called herein residual performance)—a performance for member S for a time period p that is not attributable to factors defined by a factor model, or a collection of such performances over periods in history H. In some embodiments, the member residual performance for member S in a time period p corresponds to a difference between a performance of member S for a time period p and a member factor performance of member S for the same time period p.

Member residual performances—a collection of residual performances for members (S1, . . . , Sn) in a group P over a time period p.

Group factor performance—a performance of group P for a time period p contributed by factor F. In some cases, the group factor performance is determined based on the group factor exposure of P to factor F for the time period p and the performance of factor F during the time period p. In statistical programming notation, this can be expressed as follows:

group.factor.performance.contribution[P, F, p]=group.factor.exposure[P, F, p]*factor.performance[F, p]

In some cases, group factor performance refers to a performance of a group P for a time period p contributed by all factors defined by a factor model. In some cases, the group factor performance is determined based on the group factor exposures of P and factor performances for a time period p. In statistical programming notation, this can be expressed as follows:

group.factor.performance[P, p]=sum(group.factor.exposures[P, p]*factor.performances[p])

Group residual performance (also called herein group idiosyncratic performance)—a performance of a group P over a time period p that is not attributable to factors defined by a factor model. In some embodiments, the group residual performance for a group P corresponds to a difference between of a performance of group P for a time period p and group factor performance of the group P for the same time period p.

Benchmark—a model group used to evaluate a relative performance of one or more groups (e.g., all drilling contractors). As used herein, a performance benchmark refers to a performance (e.g., a performance) of a benchmark.

Active management skill—one or both of: member selection skill and factor timing skill.

Factor timing skill—an ability of an agent to consistently identify ex-ante a factor F and a period p from the aggregate history H such that the rate of performance for a factor F in a time period p exceeds a rate of performance for the factor F over history H.

Member selection skill (also called herein member picking skill)—the ability of an agent to consistently identify a member S and period p from the aggregate history H such that the residual.performance[S, p]>0.

Factor timing performance (also called herein active factor performance, dynamic factor performance or factor timing performance)—a performance generated by varying a group factor exposure to a factor F over history H in excess of a performance that would have been generated by maintaining a constant (e.g., average) exposure to the factor F over history H. This may be expressed in statistical programming notation as follows:

group.factor.dynamic.performance[P, F, p]=group.factor.performance.contribution[P, F, p]−group.factor.static.performance[P, F, p]

Member selection performance (also called herein member picking performance, idiosyncratic performance or residual performance)—group residual performance for group P over history H. Performance not attributable to the group factor exposures.

group.selection.performance[P, p]=sum(group.member.exposures[P, p]*member.residual.performances[P, p])

Active performance (also called herein dynamic performance)—A sum of factor timing performance and member selection performance. An active performance corresponds to a difference between a performance of group P and a performance of benchmark B for a time period p of the history H where benchmark B has group factor exposures that are the representative group factor exposures of P over the history H. Note that this is substantially different from the definition of active performance in the existing attribution method such as the Brinson model which may pick B without regard for the similarity of the group factor exposures of B and representative group factor exposures of P over the history H.

Passive performance (also called herein static performance and static factor performance)—A performance of benchmark B, where benchmark B has group factor exposures that are the representative group factor exposures of P over history H.

Active factor exposures—differences in factor exposures between a group P and a benchmark B for a time period p of the history H where benchmark B has group factor exposures that are the representative group factor exposures of P over the history H.

Evidence of skill—statistical evidence that an agent possesses factor timing or member selection skill.

Confidence in skill—confidence level that an agent possesses factor timing or member selection skill.

What is claimed is:

1. A computer system, comprising:
one or more processors; and
memory storing one or more programs for execution by the one or more processors, the one or more programs including instructions for:
receiving, at the computer system, a request to quantify factor timing performance associated with a respective group of members;
obtaining, at the computer system, historical performance data for a plurality of predefined factors;
obtaining, at the computer system, historical group factor exposure data for the plurality of predefined factors for the respective group, wherein a respective entry in the historical group factor exposure data represents a relationship between a respective entry in historical performance data of the respective group and a respective entry in historical performance data of a respective factor of the plurality of predefined factors for a respective time period;
generating, at the computer system, historical group factor performance data for the plurality of predefined factors for the respective group in accordance with the historical performance data for the plurality of predefined factors and the historical group factor exposure data for the plurality of predefined factors for the respective group;
storing, at the computer system, the historical group factor performance data for the plurality of predefined factors for the respective group;
generating, at the computer system, historical group static factor performance data for the plurality of predefined factors for the respective group in accordance with the historical performance data for the plurality of predefined factors and one or more representative values of the historical group factor exposure data for the plurality of predefined factors for the respective group;
storing, at the computer system, the historical group static factor performance data for the plurality of predefined factors for the respective group;
generating, at the computer system, historical group dynamic factor performance data for the plurality of predefined factors for the respective group in accordance with the historical group factor performance data for the plurality of predefined factors for the respective group and the historical group static factor performance data for the plurality of predefined factors for the respective group, wherein a respective entry in the historical group dynamic factor performance data represents the factor timing performance associated with the respective group for a respective factor for a respective time period;

storing, at the computer system, the historical group dynamic factor performance data for the plurality of predefined factors for the respective group; and providing one or more values that represent the historical group dynamic factor performance data.

2. The system of claim 1, wherein the one or more programs include instructions for:

subsequent to generating the historical group dynamic factor performance data, determining one or more values that indicate reliability of the historical group dynamic factor performance data; and providing the one or more values that indicate reliability of the historical group dynamic factor performance data.

3. The system of claim 1, wherein the one or more programs include instructions for:

generating historical group residual performance data for the respective group in accordance with the historical group performance data for the respective group and the historical group factor performance data for the plurality of predefined factors for the respective group, wherein a respective entry in the historical group residual performance data represents member selection performance associated with the respective group;

storing the historical group residual performance data for the respective group; and providing one or more values that represent the historical group residual performance data.

4. The system of claim 3, wherein the one or more programs include instructions for:

determining one or more values that indicate reliability of the historical group residual performance data; and providing the one or more values that indicate reliability of the historical group residual performance data.

5. The system of claim 3, wherein the one or more programs include instructions for:

determining one or more combined values from the historical group dynamic factor performance data and the historical group residual performance data, a respective combined value, of the one or more combined values, corresponding to a sum of one or more respective values in the historical group dynamic factor performance data and one or more corresponding values in the historical group residual performance data; and providing at least a subset of the one or more combined values.

6. The system of claim 1, wherein the one or more programs include instructions for:

identifying a plurality of groups associated with a respective agent, wherein the plurality of groups includes the respective group;

generating historical group dynamic factor performance data for the plurality of predefined factors for particular groups of the plurality of groups;

storing the historical group dynamic factor performance data for the plurality of predefined factors for the particular groups of the plurality of groups; and providing one or more values that represent the historical group dynamic factor performance data for the plurality of predefined factors for the particular groups of the plurality of groups.

7. The system of claim 1, wherein the one or more programs include instructions for:

identifying a plurality of groups associated with a respective agent, wherein the plurality of groups includes the respective group;

generating historical group residual performance data for particular groups in the plurality of groups;

storing the historical group residual performance data for the particular groups in the plurality of groups; and providing one or more values that represent the historical group residual performance data for the particular groups of the plurality of groups.

8. The system of claim 7, wherein a first group of the plurality of groups spans over a first time period and a second group of the plurality of groups spans over a second time period distinct from the first time period.

9. The system of claim 1, wherein the one or more programs include instructions for:

identifying a respective range based on the historical group factor exposure data for a respective factor;

determining whether a current group factor exposure for the respective factor is outside of the respective range for the respective factor; and, in accordance with a determination that the current group factor exposure for the respective factor is outside of the respective range for the respective factor, providing a notification indicating that the current group factor exposure for the respective factor is outside the respective range for the respective factor.

10. The system of claim 1, wherein the one or more programs include instructions for:

displaying a graph representing entries in the historical group factor exposure data for a second factor and entries in the historical performance data of the second factor, wherein the graph includes a plurality of data points, a respective data point having a first axis value that corresponds to a respective entry in the historical group factor exposure data for the second factor and a second axis value that corresponds to a corresponding entry in the historical performance data of the second factor.

11. The system of claim 1, wherein the one or more programs include instructions for:

generating historical group residual performance data for a subset of the respective group in accordance with historical group performance data for the subset of the respective group and the historical group factor performance data for the subset of the respective group, wherein a respective entry in the historical group residual performance data represents residual member selection performance associated with the subset of the respective group; and storing the historical group residual performance data for the subset of the respective group.

12. The system of claim 1, wherein the one or more programs include instructions for:

generating historical group residual performance data for a first group, wherein the first group includes members in the respective group and the members in the first group have same weights as each other;

storing the historical group residual performance data for the first group; and providing one or more values that represent the historical group residual performance data for the first group.

13. The system of claim 12, wherein the one or more programs include instructions for:

generating historical group residual performance data for a subset of the respective group in accordance with historical group performance data for the subset of the respective group and the historical group factor performance data for the subset of the respective group, wherein a respective entry in the historical group residual performance data represents residual member selection performance associated with the subset of the respective group;
generating expected residual performance data for the subset of the respective group in accordance with one or more of the historical group residual performance data for the respective group, the historical group residual performance data for the subset of the respective group, a difference of the historical group residual performance data for the subset of the respective group and historical group residual performance data for a first group, and current group factor exposure data for the subset of the respective group, wherein the first group includes members in the respective group and the members in the first group have same weights as each other; and
storing the expected residual performance data for the subset of the respective group.

14. The system of claim 13, wherein the one or more programs include instructions for:
repeating generating expected residual performance data for distinct subsets of the respective group;
generating expected residual performance data for the respective group in accordance with the expected residual performance data for the distinct subsets of the respective group; and
storing the expected residual performance data for the respective group.

15. The system of claim 1, wherein the historical group factor exposure data is determined in accordance with historical member factor exposure data and historical group member weight data.

16. The system of claim 1, including:
displaying a first chart selected from a set of charts that include:
a chart that includes a plurality of first data points, a respective first data point corresponding to a distinct group, the respective first data point having a first axis value that represents one of: the historical group dynamic factor performance data for the distinct group and a value that indicates reliability of the historical group dynamic factor performance data and a second axis value that represents one of: the historical group residual performance data for the distinct group and a value that indicates reliability of the historical group residual performance data;
a chart that illustrates a two-dimensional matrix of cells, wherein one of a column of cells or a row of cells corresponds to a respective time period and the other of the column of cells and the row of cells corresponds to a distinct group, and a respective cell of the cells corresponds to one of: the respective entry in the historical group dynamic factor performance data, the respective entry in the historical group residual performance data, a value that represents cumulative historical group dynamic factor performance data for a predefined set of periods, a value that represents cumulative historical group residual performance data for a predefined set of periods, and a respective combined value corresponding to a sum of one or more respective values in the historical group dynamic factor performance data and one or more corresponding values in the historical group residual performance data;
a correlation chart that illustrates a two-dimensional matrix that graphically represents correlation of performances of a plurality of groups, wherein the correlation is determined based on one or more of: the historical group dynamic factor performance data for respective groups, and the historical group residual performance data for the respective groups; and
a dendrogram that graphically illustrates clustering of performances of the plurality of groups, wherein the clustering is determined based on one or more of: the historical group dynamic factor performance data for respective groups, and the historical group residual performance data for the respective groups;
concurrently displaying one or more user interface elements with the first chart;
while displaying the first chart and the one or more user interface elements, detecting a selection of one of the one or more user interface elements; and
replacing the display of the first chart with a display of a second chart, wherein the second chart is selected from the set of charts and the second chart is distinct from the first chart.

17. The system of claim 1, wherein the one or more programs include instructions for:
generating expected dynamic factor performance data for a respective factor in accordance with the historical group dynamic factor performance data and current group factor exposure data for the respective group for the respective factor; and
storing the expected dynamic factor performance data for the respective factor.

18. The system of claim 17, wherein the one or more programs include instructions for:
repeating generating expected dynamic factor performance data for distinct factors of the respective group;
generating expected dynamic factor performance data for the respective group in accordance with the expected dynamic factor performance data for the distinct factors; and
storing the expected aggregate dynamic factor performance data for the respective group.

19. A method for quantifying performance of a group, comprising:
receiving, at a computer system with one or more processors and memory, a request to quantify factor timing performance associated with a respective group;
obtaining, at the computer system, historical performance data for a plurality of predefined factors;
obtaining, at the computer system, historical group factor exposure data for the plurality of predefined factors for the respective group, wherein a respective entry in the historical group factor exposure data represents a relationship between a respective entry in historical performance data of the respective group and a respective entry in historical performance data of a respective factor of the plurality of predefined factors for a respective time period;
generating, at the computer system, historical group factor performance data for the plurality of predefined factors for the respective group in accordance with the historical performance data for the plurality of predefined factors and the historical group factor exposure data for the plurality of predefined factors for the respective group;
storing, at the computer system, the historical group factor performance data for the plurality of predefined factors for the respective group;
generating, at the computer system, historical group static factor performance data for the plurality of predefined factors for the respective group in accordance with the historical performance data for the plurality of predefined factors and one or more representative values of the historical group factor exposure data for the plurality of predefined factors for the respective group;

storing, at the computer system, the historical group static factor performance data for the plurality of predefined factors for the respective group;

generating, at the computer system, historical group dynamic factor performance data for the plurality of predefined factors for the respective group in accordance with the historical group factor performance data for the plurality of predefined factors for the respective group and the historical group static factor performance data for the plurality of predefined factors for the respective group, wherein a respective entry in the historical group dynamic factor performance data represents the factor timing performance associated with the respective group for a respective factor for a respective time period;

storing, at the computer system, the historical group dynamic factor performance data for the plurality of predefined factors for the respective group; and providing one or more values that represent the historical group dynamic factor performance data.

20. A non-transitory computer readable storage medium, storing one or more programs for execution by one or more processors of a computer system, the one or more programs including instructions for:

receiving, at a computer system with one or more processors and memory, a request to quantify factor timing performance associated with a respective group;

obtaining, at the computer system, historical performance data for a plurality of predefined factors;

obtaining, at the computer system, historical group factor exposure data for the plurality of predefined factors for the respective group, wherein a respective entry in the historical group factor exposure data represents a relationship between a respective entry in historical performance data of the respective group and a respective entry in historical performance data of a respective factor of the plurality of predefined factors for a respective time period;

generating, at the computer system, historical group factor performance data for the plurality of predefined factors for the respective group in accordance with the historical performance data for the plurality of predefined factors and the historical group factor exposure data for the plurality of predefined factors for the respective group;

storing, at the computer system, the historical group factor performance data for the plurality of predefined factors for the respective group;

generating, at the computer system, historical group static factor performance data for the plurality of predefined factors for the respective group in accordance with the historical performance data for the plurality of predefined factors and one or more representative values of the historical group factor exposure data for the plurality of predefined factors for the respective group;

storing, at the computer system, the historical group static factor performance data for the plurality of predefined factors for the respective group;

generating, at the computer system, historical group dynamic factor performance data for the plurality of predefined factors for the respective group in accordance with the historical group factor performance data for the plurality of predefined factors for the respective group and the historical group static factor performance data for the plurality of predefined factors for the respective group, wherein a respective entry in the historical group dynamic factor performance data represents the factor timing performance associated with the respective group for a respective factor for a respective time period;

storing, at the computer system, the historical group dynamic factor performance data for the plurality of predefined factors for the respective group; and providing one or more values that represent the historical group dynamic factor performance data.

\* \* \* \* \*